United States Patent
Benson et al.

(10) Patent No.: US 7,076,588 B2
(45) Date of Patent: Jul. 11, 2006

(54) HIGH SPEED MULTIPLE PORTED BUS INTERFACE CONTROL

(75) Inventors: Anthony Joseph Benson, Roseville, CA (US); Thin Nguyen, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 449 days.

(21) Appl. No.: 10/370,414

(22) Filed: Feb. 18, 2003

(65) Prior Publication Data

US 2004/0177194 A1    Sep. 9, 2004

(51) Int. Cl.
*G06F 13/00*    (2006.01)
(52) U.S. Cl. ...................... 710/300; 710/305
(58) Field of Classification Search ......... 710/300–305
See application file for complete search history.

(56) References Cited

U.S. PATENT DOCUMENTS

| | | | |
|---|---|---|---|
| 6,567,879 B1 * | 5/2003 | Benson et al. | 710/305 |
| 6,715,019 B1 * | 3/2004 | Benson et al. | 710/305 |
| 6,748,477 B1 * | 6/2004 | Benson et al. | 710/305 |

* cited by examiner

Primary Examiner—Tim Vo

(57) ABSTRACT

A bus controller is capable of controlling a dual ported bus interface in combination with a peer interface. The bus controller comprises a state machine capable of executing in the dual ported bus interface. The dual ported bus interface has first and second front end ports for connection to hosts, and is capable of insertion into one of first and second slots for connection to one or more buses on a backplane. The state machine determines bus interface state based on information from the peer interface received across the backplane, and status of the first and second front end ports.

41 Claims, 9 Drawing Sheets

Power UP State Table 1

| | BCC Position | Front End Connection | Fault | Power Up Timer | Internal Primary Signal | External Primary Signal | Peer Bcc | Peer Fault | Card State |
|---|---|---|---|---|---|---|---|---|---|
| 1 | Slot A | Proper Connection | No Fault | Not App | High -> Low | High -> Low | Present | No Fault | Primary |
| 2 | Slot A | Proper Connection | No Fault | Not App | High -> Low | High -> Low | Not Present | No Fault | Primary |
| 3 | Slot A | Proper Connection | No Fault | Not App | High | Low | Present | No Fault | Secondary |
| 4 | Slot A | Unconnected | No Fault | Not App | High -> Low | High | Present | No Fault | Pseudo-Primary |
| 5 | Slot A | Improper Connection | No Fault | Not App | High -> Low | High | Present | No Fault | Pseudo-Flt-Pri |
| 6 | Slot A | Unconnected | No Fault | Not App | High -> Low | High | Not Present | No Fault | Pseudo-Primary |
| 7 | Slot A | Improper Connection | No Fault | Not App | High -> Low | High | Not Present | No Fault | Psuedo-Flt-Pri |
| 8 | Slot A | Unconnected | No Fault | Not App | High | Low | Present | No Fault | Psuedo-Sec |
| 9 | Slot A | Improper Connection | No Fault | Not App | High | Low | Present | No Fault | Pseudo-Flt-Sec |
| 10 | Slot B | Proper Connection | No Fault | Expired | High -> Low | High -> Low | Present | No Fault | Primary |
| 11 | Slot B | Proper Connection | No Fault | Expired | High -> Low | High -> Low | Not Present | No Fault | Primary |
| 12 | Slot B | Proper Connection | No Fault | Expired | High | Low | Present | No Fault | Secondary |
| 13 | Slot B | Unconnected | No Fault | Expired | High | High | Present | No Fault | Pseudo-Sec |
| 14 | Slot B | Improper Connection | No Fault | Expired | High | High | Present | No Fault | Pseudo-Flt-Sec |
| 15 | Slot B | Unconnected | No Fault | Expired | High -> Low | High | Not Present | No Fault | Pseudo-Primary |
| 16 | Slot B | Improper Connection | No Fault | Expired | High -> Low | High | Not Present | No Fault | Pseudo-Flt-Pri |
| 17 | Slot B | Unconnected | No Fault | Expired | High | Low | Present | No Fault | Pseudo-Sec |
| 18 | Slot B | Improper Connection | No Fault | Expired | High | Low | Present | No Fault | Pseudo-Flt-Sec |
| 19 | X | X | Fault | x | X -> High | X -> High | X | X | Fault |
| 20 | X | Proper Connection | No Fault | X | X -> Low | X -> Low | Present | Fault | Primary |
| | Note: Cross card reset may be required if the external Primary signal is not released by the failing card | | | | | | | | |
| 21 | X | Unconnected | No Fault | X | | X -> High | Present | Fault | Pseudo-Primary |
| | Note: Cross card reset may be required if the external Primary signal is not released by the failing card | | | | | | | | |
| 22 | X | Improper Connection | No Fault | X | X -> Low | X -> High | Present | Fault | Pseudo-Fault |
| | Note: Cross card reset may be required if the external Primary signal is not released by the failing card | | | | | | | | |

FIGURE 3

HIGH SPEED MULTIPLE PORTED BUS INTERFACE CONTROL

RELATED APPLICATIONS

The disclosed system and operating method are related to subject matter disclosed in the following co-pending patent applications that are incorporated by reference herein in their entirety: (1) U.S. patent application Ser. No. 10/370,358, entitled "High Speed Multiple Port Data Bus Interface Architecture"; (2) U.S. patent application Ser. No. 10/370,361, entitled "High Speed Multiple Ported Bus Interface Expander Control System"; (3) U.S. patent application Ser. No. 10/370,326, entitled "High Speed Multiple Ported Bus Interface Port State Identification System"; (4) U.S. Pat. No. 6,810,439, entitled "System and Method to Monitor Connections to a Device"; (5) U.S. patent application Ser. No. 10/370,364, entitled "High Speed Multiple Ported Bus Interface Reset Control System"; and (6) U.S. Pat No. 6,896,541, entitled "Interface Connector that Enables Detection of Cable Connection".

BACKGROUND OF THE INVENTION

A computing system may use an interface to connect to one or more peripheral devices, such as data storage devices, printers, and scanners. The interface typically includes a data communication bus that attaches and allows orderly communication among the devices and the computing system. A system may include one or more communication buses. In many systems a logic chip, known as a bus controller, monitors and manages data transmission between the computing system and the peripheral devices by prioritizing the order and the manner of device control and access to the communication buses. Control rules, also known as communication protocols, are imposed to promote the communication of information between computing systems and peripheral devices. For example, Small Computer System Interface or SCSI (pronounced "scuzzy") is an interface, widely used in computing systems, such as desktop and mainframe computers, that enables connection of multiple peripheral devices to a computing system.

In a desktop computer SCSI enables peripheral devices, such as scanners, CDs, DVDs, and Zip drives, as well as hard drives to be added to one SCSI cable chain. In network servers SCSI connects multiple hard drives in a fault-tolerant cluster configuration in which failure of one drive can be remedied by replacement from the SCSI bus without loss of data while the system remains operational. A fault-tolerant communication system detects faults, such as power interruption or removal or insertion of peripherals, allowing reset of appropriate system components to retransmit any lost data.

A SCSI communication bus follows the SCSI communication protocol, generally implemented using a 50 conductor flat ribbon or round bundle cable of characteristic impedance of 100 Ohm. SCSI communication bus includes a bus controller on a single expansion board that plugs into the host computing system. The expansion board is called a Bus Controller Card (BCC), SCSI host adapter, or SCSI controller card.

In some embodiments, single SCSI host adapters are available with two controllers that support up to 30 peripherals. SCSI host adapters can connect to an enclosure housing multiple devices. In mid to high-end markets, the enclosure may have multiple controller interface or controller cards forming connection paths from the host adapter to SCSI buses resident in the enclosure. Controller cards can also supply bus isolation, configuration, addressing, bus reset, and fault detection operations for the enclosure.

One or more controller cards may be inserted or removed from the backplane while data communication is in process, a characteristic termed "hot plugging."

Single-ended and high voltage differential (HVD) SCSI interfaces have known performance trade-offs. Single ended SCSI devices are less expensive to manufacture. Differential SCSI devices communicate over longer cables and are less susceptible to external noise influences. HVD SCSI is more expensive. Differential (HVD) systems use 64 milliamp drivers that draw too much current to enable driving the bus with a single chip. Single ended SCSI uses 48 milliamp drivers, allowing single chip implementations. High cost and low availability of differential SCSI devices has created a market for devices that convert single ended SCSI to differential SCSI so that both device types coexist on the same bus. Differential SCSI in combination with a single ended alternative is inherently incompatible and has reached limits of physical reliability in transfer rates, although flexibility of the SCSI protocol allows much faster communication implementations.

SUMMARY OF THE INVENTION

In accordance with some embodiments of the illustrative system, a bus controller is capable of controlling a dual ported bus interface in combination with a peer interface. The bus controller comprises a state machine capable of executing in the dual ported bus interface. The dual ported bus interface has first and second front end ports for connection to hosts, and is capable of insertion into one of first and second slots for connection to one or more buses on a backplane. The state machine determines bus interface state based on information from the peer interface received across the backplane, and status of the first and second front end ports.

According to another embodiment, a dual ported bus interface is capable of operating in concert with a peer interface and insertable into one of first and second slots for connection to one or more buses. The bus controller comprises first and second front end ports capable of connecting to hosts, first and second isolator/expanders respectively coupled to the first and second front end ports, a controller coupled to the first and second isolator/expanders, and a state machine coupled to the controller. The state machine is capable of operating in a plurality of states. The state machine uses front end connection status in combination with signals from the peer interface to determine state.

In accordance with a further embodiment, a method of controlling a bus interface comprises controlling a dual ported bus interface having first and second front end ports in conjunction with a peer interface. The bus interface is capable of insertion into one of first and second slots. The method further comprises determining bus interface state based on information from the peer interface received across the backplane and status of the first and second front end ports.

BRIEF DESCRIPTION OF THE DRAWINGS

Embodiments of the invention relating to both structure and method of operation, may best be understood by referring to the following description and accompanying drawings.

FIG. 3 is a power up state table that illustrates how state is identified on power up.

DETAILED DESCRIPTION

To address deficiencies and incompatibilities inherent in the physical SCSI interface, Low Voltage Differential SCSI (LVD) has been developed. Twenty-four milliamp LVD drivers can easily be implemented within a single chip, and use the low cost elements of single ended interfaces. LVD can drive the bus reliably over distances comparable to differential SCSI. LVD supports communications at faster data rates, enabling SCSI to continue to increase speed without changing from the LVD physical interface.

A SCSI expander is a device that enables a user to expand SCSI bus capabilities. A user can combine single-ended and differential interfaces using an expander/converter, extend cable lengths to greater distances via an expander/extender, isolate bus segments via an expander/isolator. A user can increase the number of peripherals the system can access, and/or dynamically reconfigure SCSI components. For example, systems based on HVD SCSI can use differential expander/converters to allow a system to access a LVD driver in the manner of a HVD driver.

What is desired in a bus interface that supports high speed signal transmission using LVD drivers is a capability to quickly determine interface state. What is further desired is an interface with a capability to ensure that the bus interfaces in an enclosure settle in an appropriate state to enable a system to accurate make configuration decisions and appropriately react to changes in enclosure configuration.

The disclosed interface determines interface status based not only on signals received from a peer interface from across the backplane but also takes into account front end connection status and controller card status to determine interface state.

Figure 1:
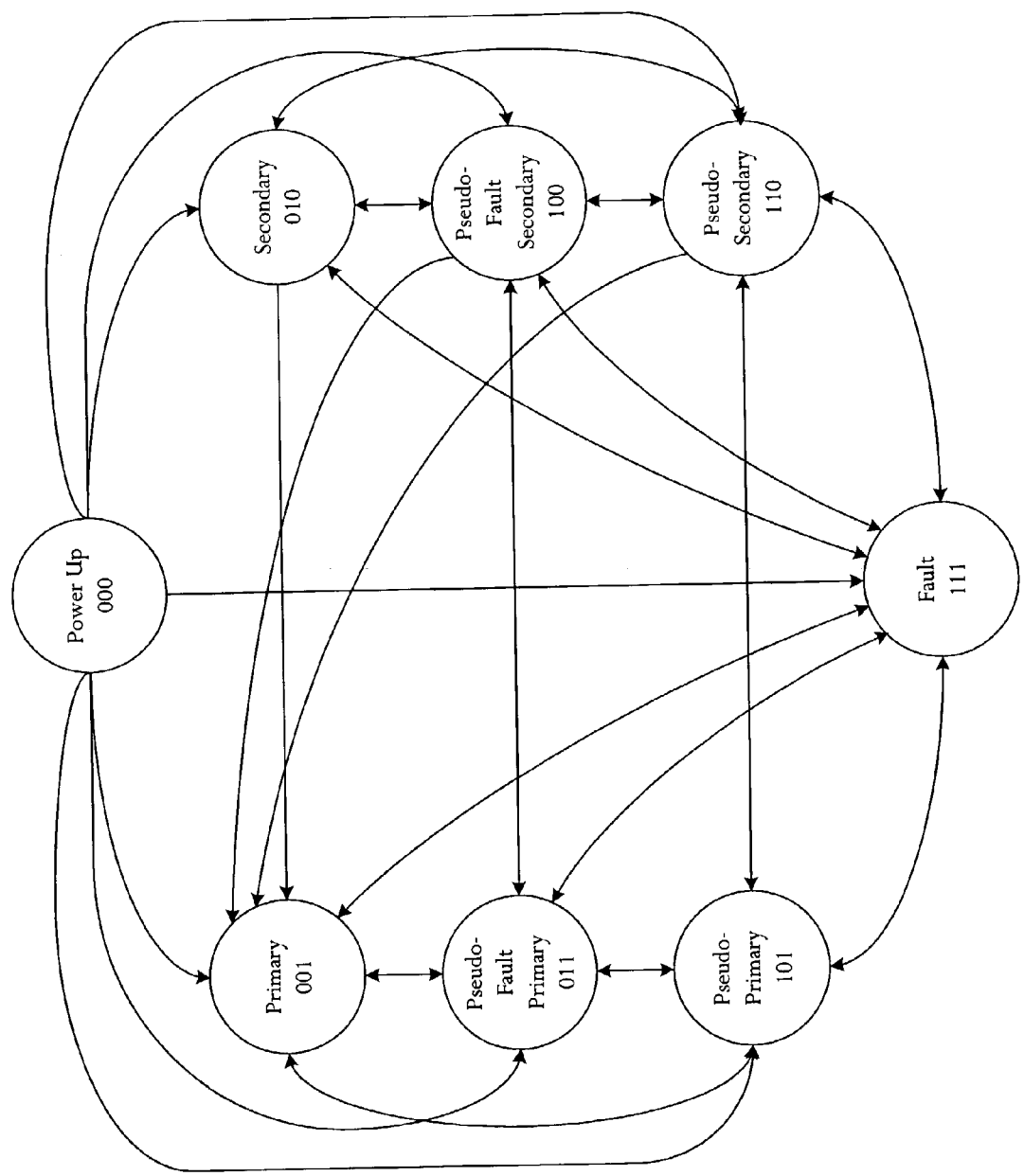
FIG. 1 is a state diagram that depicts card status state flow.

Referring to FIG. 1, a state diagram depicts state flow in a system capable of controlling a bus interface. In a specific embodiment, the system can control a hot swappable high-speed dual port bus interface card such as a Small Computer Systems Interface (SCSI) bus interface card shown as an enclosure and bus controller card in FIG. 9.

The illustrative control flow can be configured to attain one or more of multiple functions including avoiding data corruption, controlling common elements, avoiding bus contention, and notifying a user of incorrect configurations. The interface performs a control flow that includes multiple states. Functional elements in the interface, for example electronic hardware and programming elements, perform various actions in response to events and conditions in each state. In a particular example, the electronic hardware can comprise various electronic circuit devices such as field programmable gate arrays (FPGAs) and the programming elements can comprise executable firmware code. The control flow operates upon the interface functional elements, for example firmware that interfaces with FPGA code, and ensures, at the lowest possible level, that the interface will define a state without depending on other information that passes between functional elements of the interface. Eliminating dependence on information passed between interface functional elements enables at least one card to become functional if communication between the functional elements becomes disabled.

In a specific embodiment, the control flow can operate in a dual port bus interface card or bus controller card (BCC). The interface can couple to one or more host computers via a front end and can couple to a backplane of a data bus via a back end. At the back end, terminators can be connected to backplane connectors to signal the terminal end of the data bus. Proper functionality of the terminators depends on supply of sufficient "term power" from the data bus, typically supplied by a host adapter or other devices on the data bus. The dual port system accordingly includes two interfaces or BCCs. Each interface performs the control flow in conjunction with operations of the second interface, called the peer interface or peer card. Each interface has a controller that can execute instructions to control the interface, communicate status information and data to host computers via a data bus, such as a SCSI bus; and can also support diagnostic procedures for various components of system. Each interface can also include one or more bus expanders that allow a user to expand the bus capabilities. For example, an expander can mix single-ended and differential interfaces, extend cable lengths, isolate bus segments, increase the number of peripherals the system can access, and/or dynamically reconfigure bus components. The dual port bus interface can be arranged in multiple configurations including, but not limited to, two host computers connected to a single interface in full bus mode, two interfaces in full or split bus mode and two host computers with each interface connected to an associated host computer, and two interfaces in full or split bus mode and four host computers.

In the specific embodiment, the functional elements on the interface can communicate via a system bus, for example a relatively low-speed system bus such as an Inter-IC bus (I2C). The control flow eliminates dependence on information passed on the I2C bus(es), enabling at least one card to become functional if the I2C bus fails.

In some embodiments, the interface can have configuration switches such as a DIP switch to control interface configuration.

The illustrative control flow comprises eight states, a Power Up state 000, a Primary state 001, a Secondary state 010, a Pseudo-Fault Primary state 011, Pseudo-Fault Secondary state 100, a Pseudo-Primary state 101, a Pseudo-Secondary state 110, and a Fault state 111.

The control flow shows several general considerations. From Power Up state 000 the interface can go to any state but no state can go back to the Power Up state 000. The interface can go into the Fault state 111 from any state and from the Fault state 111 back to the state prior to the Fault state 111 if the fault can be cleared and after the fault is cleared. Two main states exist, the Primary state 001 and the Secondary state 010. Both the Primary state 001 and the Secondary state 010 have two corresponding pseudo states, the Pseudo-Fault Primary state 011 and the Pseudo-Primary state 101 associated with the Primary state 001, and the Pseudo-Fault Secondary state 100 and the Pseudo-Secondary state 110 associated with the Secondary state 010.

On application of power, the interface enters the Power Up state 000.

The interface enters the Primary state 001 when no current faults exist, the interface is connected correctly and the peer interface is not already in the Primary state. The interface performs multiple operations in the Primary state 001. The interface drives common functional elements on the interface including display devices such as light emitting diodes (LEDs), and annunicators or buzzers, and reset switches. The interface actuates, for example pulls down, external and internal Primary signals to indicate that the Primary state is taken. In the Primary state 001, the interface controller is allowed to connect to the data bus regardless of the interface configuration. In the Primary state 001, the interface enables a second expander when in Full Bus mode and the front end is properly connected. Furthermore, the interface can send information about the switch configuration of the interface to the Secondary or peer interface for review.

The interface enters the Pseudo-Primary state 101 when front end ports of the interface are not connected or the front end ports are properly connect but term power is unavailable or insufficient, and the peer interface cannot assume Primary functionality. In the Pseudo-Primary state 101, the interface drives the common interface functional elements such as LEDs, buzzers, and reset switches. The interface isolates the front end from the backplane. The interface does not drive the external Primary signal but does drive the internal Primary signal. The interface can send information regarding configuration switch settings to the Secondary or peer interface for review.

The interface enters the Pseudo-Fault Primary state 011 when only one front end port is not connected. In some embodiments, the interface controllers handle only differential signals, such as low voltage differential (LVD) signals to eliminate requirements for supporting single ended (SE) signals, thereby simplifying impedance matching considerations. In these embodiments, the interface the Pseudo-Fault Primary state 011 when a diff_sense signal indicates absence of an LVD connection and the peer interface cannot assume the Primary state 001. In the Pseudo-Fault Primary state 011 the interface flashes an alert signal, such as illuminating a light-emitting diode (LED) and/or sounding a buzzer or annunicator, indicative of an interface fault to indicate an improper front end configuration. The interface resets or disables expanders to isolate the interface from the backplane. The interface does not drive the external Primary signal but instead drives an internal Primary signal high indicating that the interface continues to drive the common elements. Also in the Pseudo-Fault Primary state 011, the interface maintains the front end data bus in a reset condition while releasing the back end after disabling the expanders.

The interface enters the Secondary state 010 when no current faults exist, the interface is connected correctly, and configuration switches match for the peer interface which has assumed the Primary state 001 and the interface which accordingly assumes the Secondary state 010. In the Secondary state 010, the interface compares configuration switches to the configuration switches of the peer interface in the Primary state 001 to verify proper configuration. If configuration switches do not match, the interface enters the Pseudo-Fault Secondary state 100. In the Secondary state 010, the interface controller is allowed to connect to the data bus only in the Split bus mode. In the Secondary state 010, the interface only enables one expander depending on the physical connection of the interface. In a specific embodiment with two slots, a slot A and a slot B, generally the interface in slot A aligns with the expander connecting to high addresses. However in full bus mode and if the interface in slot A is secondary, the expander associated with low addresses is enabled. The same constraints are imposed on slot B.

The interface enters the Pseudo-Secondary state 110 when the two front end ports of the interface are not connected or the front end ports are connected properly but without term power, and the peer interface is located in slot A and not faulted. When the interface is in the Pseudo-Secondary state 110 due to an unconnected front end the interface isolates the front end from the backplane by disabling the expanders in any pseudo state, drives neither the external Primary signal nor the internal primary signal, and compares configuration switches. The interface compares configuration switches to the switches of the Primary interface to determine whether configuration is proper. If not configured properly, the interface enters the Pseudo-Fault Secondary state 100.

The interface enters the Pseudo-Fault Secondary state 100 when only one front end port is not connected or the diff_sense signal indicates no LVD connection, or the configuration switches are mismatched. Slot A will contain an unfaulted peer interface since, otherwise, the interface will be in the Pseudo-Fault Primary state 011. In the Pseudo-Fault Secondary state 100 the interface flashes an alert signal, such as illuminating a light-emitting diode (LED) and/or sounding a buzzer or annunicator, indicative of an interface fault to indicate an improper front end configuration or a configuration switch mismatch. The interface resets or disables expanders to isolate the interface from the backplane. The interface drives neither the external Primary signal nor the internal Primary signal. The interface maintains the front end data bus in a reset condition while releasing the back end after disabling the expanders. In a specific embodiment, the interface can cease driving a signal indicating that the interface is not Primary, for example allowing #PRI_BCC to be pulled high.

The interface can arrive in the Fault state 111 when the interface fails a self-test, monitored signals supply conflicting information about interface setup, or failure to download program code is determined. For example, firmware can determine that FPGA code did not download. In the Fault state 111, the interface resets the expanders to isolate the interface from the backplane if possible, drives the interface fault signal low to alert the peer interface, and displays a Fault signal, for example drives the interface Fault LED on solid. Also in Fault state 111, the controller is allowed to connect to the data bus and interact with the host if operational.

Figure 2:
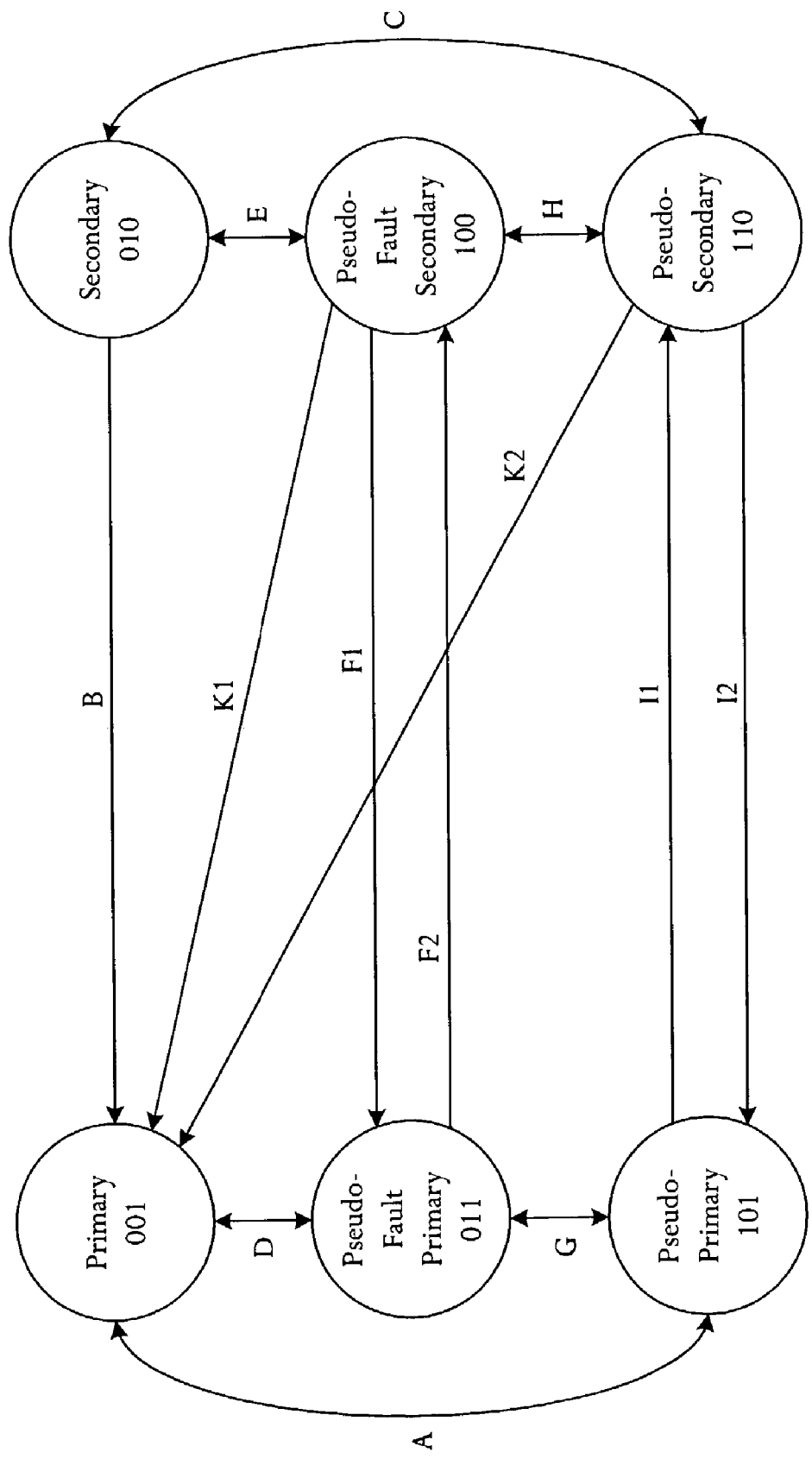
FIG. 2 a flow chart depicting a simplified controller state diagram.

Referring to FIG. 2, a flow chart depicts a simplified controller state diagram. States defined in the state diagram are simplified by removing the Power Up state 000 and Fault state 111. Transition path A between the Primary state 001 and Pseudo-Primary state 101 occurs when power is turned on or off. In the transition from Primary state 001 to Pseudo-Primary state 101, Front Status goes from Connected to Not Connected when term power is removed. A controller resets buses connected to the backplane that are associated with enabled expanders. In a specific embodiment, the field programmable gate array (FPGA) functioning as a control device resets SCSI buses associated with enabled expanders for a minimum of 25 uS. Specifically, LBACK_SCSI_RST or HBACK_SCSI_RST or LBACK_SCSI_RST in combination with HBACK_SCSI_RST are pulled high. During bus reset the expanders are hard reset, for example #EXP_RST is pulled low. Primary interface signal, for example #PRI_BCC signal, is tristated and allowed to be pulled high. The expanders are soft disabled, for example firmware can drive signals EH_WS_EN and EL_WS_EN low. The control device disables the hard expander reset due to the expander soft disable, for example the FPGA can drive #EXP_RST high. The internal primary signal, for example #IAM_PRI, is driven low.

In the transition path A from the Pseudo-Primary state 101 to the Primary state 001, Front Status goes from Not Connected to Connected when term power is reinstated. Primary status is reclaimed, for example firmware can drive low #PRI_BCC. The Front end bus reset is released, for example FRONT_SCSI_RESET is driven low. The proper expander is enabled based on the enclosure configuration. For example firmware can drive EH_WS_EN and EL_WS_EN high if BRDG_EN is high, drive EH_WS_EN high and EL_WS_EN low if BRDG_EN is low and #SLOTA is low, and otherwise drive EH_WS_EN low and EL_WS_EN high.

Transition path B from Secondary state 010 to Primary state 001 results when the peer interface is removed or transitions to another state. In the transition path B from Secondary state 010 to Primary state 001 when a peer detect signal remains low. In an illustrative embodiment, an external cross backplane primary signal (#BCC_PRI) transitions from low to high but a peer detect signal (#PEER_DET %) remains low, indicating the peer interface remains inserted. The interface goes to Primary status. In an illustrative embodiment, firmware drives the external primary signal (#BCC_PRI) low to obtain Primary status. A bridge enable signal (BRDG_EN) determines subsequent actions. If BRDG_EN is high, the expander that was not previously enabled is soft enabled and the peer interface receives configuration switch settings for review. If #SLOT_A is low, EL_WS_EN is driven high. Otherwise #SLOT_A is high and EH_WS_EN is driven high. The configuration switch, for example DIP switch, setting is sent to the peer interface. Firmware drives the internal primary signal (#IAM_PRI) low and drives shared elements to a suitable and proper level.

In an illustrative embodiment, the FPGA does not monitor the #BCC_PRI signal directly so that if #BCC_PRI transitions without the #PEER_DET % signal transitioning, the SCSI bus resets cannot be automatically driven. When the peer interface (BCC) transitions from the Primary state mode, the peer interface will reset the SCSI bus for at least 25 uS, a sufficient time for the BCC transitioning from Secondary to Primary to change configuration is appropriate. A suggested specified SCSI selection time of 250 ms should be sufficient to transition the interface from Secondary to Primary.

The transition path B from Secondary state 010 to Primary state 001 results when the external cross backplane primary signal (#BCC_PRI) transitions from low to high and the peer detect signal (#PEER_DET %) transitions from low to high indicating removal of the peer interface. All buses are reset, for example the FPGA resets all SCSI buses based on the transition of the #PEER_DET % signal for at least 25us. In the illustrative system, FRONT_SCSI_RST, LBACK_SCSI_RST, and HBACK_SCSI_RST are pulled high. Firmware drives the external primary signal (#BCC_PRI) low, obtaining primary status. If bridge enable (BRDG_EN) is high, the expander that was not previously enabled is soft enabled. In an illustrative embodiment, if #SLOT_A is low then EL_WS_EN is driven high and if #SLOT_A is high then EH_WS_EN is driven high. In some embodiments, all bus resets may be released, for example the FPGA can send a command to cease all SCSI bus resets. Firmware drives the internal primary signal (#IAM_PRI) low and drives shared elements to a suitable and proper level.

Transition path C between Secondary state 010 and Pseudo-Secondary state 110 occurs when power is turned on or off. In the transition path C from Secondary state 010 to Pseudo-Secondary state 110, Front Status goes from Connected to Not Connected when term power is removed. A control device resets buses connected to the backplane that are associated with enabled expanders. In a specific embodiment, the field programmable gate array (FPGA) functioning as a control device resets SCSI buses associated with enabled expanders for a minimum of 25 uS. Specifically, LBACK_SCSI_RST or HBACK_SCSI_RST are pulled high. During bus reset the expanders are hard reset, for example #EXP_RST is pulled low. The expanders are soft disabled, for example firmware can drive signals EH_WS_EN and EL_WS_EN low. The control device disables the hard expander reset, for example the FPGA can drive #EXP_RST high. The internal primary signal, for example #IAM_PRI, is driven high.

In the transition path C from Pseudo-Secondary state 110 to Secondary state 010, Front Status goes from Not Connected to Connected when term power is reinstated. The control device releases the Front end bus reset, for example the FPGA drives FRONT_SCSI_RESET low. The proper expander is enabled based on the enclosure configuration. For example firmware can drive EH_WS_EN high and EL_WS_EN low if #SLOTA is low, and otherwise drive EH_WS_EN low and EL_WS_EN high.

Transition path D between Primary state 001 and Pseudo-Fault Primary state 011 results when a connection is removed from the front end or added to the front end, or the connection becomes or ceases to be low voltage differential (LVD). In the transition from Primary state 001 to Pseudo-Fault Primary state 011, Front Status goes to Improperly Connected from Connected. A control device resets buses connected to the backplane that are associated with enabled expanders. In a specific embodiment, SCSI buses associated with enabled expanders are reset for a minimum of 25 uS by the field programmable gate array (FPGA) functioning as a control device. Specifically, LBACK_SCSI_RST or HBACK_SCSI_RST or LBACK_SCSI_RST in combination with HBACK_SCSI_RST are pulled high. The front end bus is reset, for example FRONT_SCSI_RESET is driven high, until a Front end state of the interface does to a Connect status or a Not Connect status. During bus reset the expanders are hard reset, for example #EXP_RST is pulled low. Primary interface signal, for example #PRI_BCC signal, is tristated and allowed to be pulled high. The expanders are soft disabled, for example firmware can drive signals EH_WS_EN and EL_WS_EN low. The control device disables the hard expander reset due to the expander soft disable, for example the FPGA can drive #EXP_RST high. A buzzer can be sounded for a short time to indicate the Pseudo-Fault Primary state 011, for example firmware can send a command to the FPGA to drive ENC_BUZZ high for a specified time period. A fault light emitting diode (LED) can be flashed to indicate a configuration fault, for example firmware can tristate and drive low BCC_FLT_LED at a predetermined rate. The internal primary signal, for example #IAM_PRI, is driven low.

In the transition path D from Pseudo-Fault Primary state 011 to Primary state 001, Front Status goes from Improperly Connected to Connected. Primary status is reclaimed, for example firmware can drive low #PRI_BCC. The Front end bus reset is released, for example FRONT_SCSI_RESET is driven low. The proper expander is enabled based on the enclosure configuration. For example firmware can drive EH_WS_EN and EL_WS_EN high if BRDG_EN is high, drive EH_WS_EN high and EL_WS EN low if BRDG_EN is low and #SLOTA is low, and otherwise drive EH_WS_EN low and EL_WS_EN high. The flashing of the fault LED is terminated, for example firmware can drive BCC_FLT_LED low.

Transition path E between Secondary state 010 and Pseudo-Fault Secondary state 100 results when one of two connections is removed from the front end or a single connection is added to the front end, the connection becomes or ceases to be low voltage differential (LVD), or configuration switches are mismatched. In the transition path E from Secondary state 010 to Pseudo-Fault Secondary state 100, Front Status goes to Improperly Connected from Connected or the switch configuration is changed. A control device resets buses connected to the backplane that are associated with enabled expanders. In a specific embodiment, the field programmable gate array (FPGA) functioning as a control device resets SCSI buses associated with enabled expanders for a minimum of 25 uS. Specifically, LBACK_SCSI_RST or HBACK_SCSI_RST are pulled high. During bus reset the expanders are hard reset, for example #EXP_RST is pulled low. The front end bus is reset, for example FRONT_SCSI_RESET is driven high, until a Front end state of the interface does to a Connect status or a Not Connect status. The expanders are soft disabled, for example firmware can drive signals EH_WS_EN and EL_WS_EN low. The control device disables the hard expander reset due to the expander soft disable, for example the FPGA can drive #EXP_RST high as a result of the firmware command. A buzzer can be sounded for a short time to indicate the Pseudo-Fault Primary state 011, for example firmware can send a command to the FPGA to drive ENC_BUZZ high for a specified time period. A fault light emitting diode (LED) can be flashed to indicate a configuration fault, for example firmware can tristate and drive low BCC_FLT_LED at a predetermined rate. The internal primary signal, for example #IAM_PRI, continues to be driven high.

In the transition path E from Pseudo-Fault Secondary state 100 to Secondary state 010, Front Status goes from Improperly Connected to Connected or the switch configuration is changed. The Front end bus reset is released, for example FRONT_SCSI_RESET is driven low. The proper expander is enabled based on the enclosure configuration. For example firmware can drive EH_WS_EN high and EL_WS_EN low if #SLOTA is low, and otherwise drive EH_WS_EN low and EL_WS_EN high. The flashing of the fault LED is terminated, for example firmware can drive BCC_FLT_LED low. A buzzer can be sounded on the peer interface. For example firmware can send a command to the peer interface to drive ENC_BUZZ high.

Transition path F1 from Pseudo-Fault Primary state 011 to Pseudo-Fault Secondary state 100 results when the peer interface takes over from the Primary due to transition change. An example of transition change is insertion of an interface in slot A whether the interface in slot A is connected properly or not since slot A is given priority over slot B and the external primary signal (#PRI_BCC) is not currently driven. The transition path F1 from Pseudo-Fault Primary state 011 to Pseudo-Fault Secondary state 100 results from a transition in external primary signal (#BCC_PRI) from high to low indicating the peer interface has moved to primary status. The control device, for example the FPGA, tri-states all common element signals that the device previously drove. The interface enters secondary status, for example firmware can drive the internal primary signal (#IAM_PRI) high to indicate secondary status. All expanders remain soft reset and the Fault LED on the interface remains flashing.

Transition path F2 from Pseudo-Fault Secondary state 100 to Pseudo-Fault Primary state 011 results when the peer interface is removed or faults. In the transition path F2 from Pseudo-Fault Secondary state 100 to Pseudo-Fault Primary state 011, the peer detect signal (#PEER_DET %) transitions from low to high indicating removal of the peer interface (BCC). The internal primary signal is driven low, indicating Pseudo status. Illustratively, firmware drives the internal primary signal (#IAM_PRI) low. Expanders remain soft reset and, since a fault condition remains, the Fault LED on the interface remains flashing. Firmware drives all shared elements to the proper level.

The transition path F2 from Pseudo-Fault Secondary state 100 to Pseudo-Fault Primary state 011 results when the peer fault signal (#BCC_FLT_IN %) transitions from high to low indicating the peer interface (BCC) is faulted. The internal primary signal is driven low, indicating Pseudo status. Illustratively, firmware drives the internal primary signal (#IAM_PRI) low. Expanders remain soft reset and, since a fault condition remains, the Fault LED on the interface remains flashing. Firmware drives all shared elements to the proper level.

Transition path G between Pseudo-Fault Primary state 011 and Pseudo-Primary state 101 and transition path H from Pseudo-Fault Secondary state 100 to Pseudo-Secondary state 110 result when a second connector is removed from the front end or added to the front end. In the transition path G from Pseudo-Primary state 101 to Pseudo-Fault Primary state 011, Front Status goes from Not Connected to Improperly Connected when a cable is added. The Front end bus reset is driven, for example for a SCSI bus signal FRONT_SCSI_RESET is driven high. A buzzer can be sounded for a short time to indicate the Pseudo-Fault Primary state 011, for example firmware can send a command to the FPGA to drive ENC_BUZZ high for a specified time period. A fault light emitting diode (LED) can be flashed to indicate a configuration fault, for example firmware can tristate and drive low BCC_FLT_LED at a predetermined rate.

In the transition path G from Pseudo-Fault Primary state 011 to Pseudo-Primary state 101, Front Status goes from Improperly Connected to Not Connected when a cable is removed. The Front end bus reset is driven low, disabling the, bus reset, for example in a SCSI bus, signal FRONT_SCSI_RESET is driven low. The flashing of the fault LED is terminated, for example firmware can drive BCC_FLT_LED low. The buzzer is silenced, for example firmware can send a command to the FPGA, driving ENC_BUZZ low to terminate sounding of the buzzer.

In transition path H from Pseudo-Secondary state 110 to Pseudo-Fault Secondary state 100, Front Status goes from Not Connected to Improperly Connected when a cable is added or switch configuration is changed. The Front end bus reset is driven, for example for a SCSI bus signal FRONT_SCSI_RESET is driven high. The peer interface buzzer can be sounded for a short time, for example firmware can send a command to the peer interface to drive ENC_BUZZ high for a specified time period. A fault light emitting diode (LED) can be flashed to indicate a configuration fault, for example firmware can tristate and drive low BCC_FLT_LED at a predetermined rate.

In the transition path H from Pseudo-Fault Secondary state 100 to Primary state 001, Front End Status goes from Improperly Connected to Not Connected when a cable is removed or the switch configuration is changed. A control device drives the Front end bus reset low, releasing the reset. For example, the FPGA can drive low FRONT_SCSI_RESET for a SCSI bus. The flashing of the fault LED is terminated, for example firmware can drive BCC_FLT_LED low. The buzzer is silenced, for example firmware can send a command to the FPGA, driving ENC_BUZZ low to terminate sounding of the buzzer.

Transition path I1 from Pseudo-Primary state 101 to Pseudo-Secondary state 110 results when the peer interface takes over Primary. The transition path I1 from Pseudo-Primary state 101 to Pseudo-Secondary state 110 when the external primary signal (#BCC_PRI) transitions from high to low indicating the peer interface (BCC) has taken over primary control. The control device, for example the FPGA, tri-states all common element signals that the device previously drove. The interface enters secondary status, for example firmware can drive the internal primary signal (#IAM_PRI) low to indicate secondary status. All expanders remain soft reset.

Transition path I2 from Pseudo-Secondary state 110 to Pseudo-Primary state 101 results when the peer interface is removed or faults. The transition path I2 from Pseudo-Secondary state 110 to Pseudo-Primary state 101 results when the peer interface is removed. For example, the peer detect signal (#PEER_DET %) transitions from low to high indicating peer BCC removal. Transition path I2 from Pseudo-Secondary state 110 to Pseudo-Primary state 101 can also result due to peer fault. For example, the peer fault signal (#BCC_FLT_IN %) transitions from high to low indicating the peer interface (BCC) has faulted. Firmware drives the internal primary signal (#IAM_PRI) low, with expanders remaining in soft reset, and drives shared elements to a suitable and proper level.

Transition path K1 from Pseudo-Fault Secondary state 100 to Primary state 001 is a direct transition path to the Primary state when a missing terminator is attached to the front end. The K1 transition path is used in Full Bus mode to ensure both bus expanders are enabled at the same time, allowing the host to access all drives on the bus. The Pseudo-Fault Secondary state 100 transitions K1 to Primary state 001 due to a change in front status from Improperly Connected to Connected based on the addition of a terminator or a connection to an active host. The transition K1 occurs if the external primary signal (#PRI_BCC) is at a logic high indicating no interface (BCC) has taken over Primary responsibilities. The K1 transition is highly useful in enclosure Full Bus Mode since transitioning K1 directly to the Primary state 001 ensures both expanders will be enabled together allowing the host access to all devices and components at the same time, for example disks, on the bus. In an illustrative embodiment, firmware transitions the interface to the Primary state 001. For example, firmware claims Primary status by either driving the internal primary signal (#PRI_BCC) low. If #PRI_BCC is already low, the transition would be Pseudo-Fault Secondary state 100 to Secondary state 010. Firmware also drives the internal signal indicating primary status (#IAM_PRI) low. Firmware drives all shared elements to the proper level, and enables the proper expander based on the enclosure configuration. For example firmware can drive EH_WS_EN and EL_WS_EN high if BRDG_EN is high, drive EH_WS_EN high and EL_WS_EN low if BRDG_EN is low and #SLOTA is low, and otherwise drive EH_WS_EN low and EL_WS_EN high. The Front end bus reset is released, for example FRONT_SCSI_RESET is driven low. The flashing of the fault LED is terminated, for example firmware can drive BCC_FLT_LED low.

Transition path K2 from Pseudo-Secondary state 110 to Primary state 001 is a direct transition path to the Primary state when term power is available and the diff_sense signal is detected in the low voltage differential (LVD) range. Transition path K2 is used in Full Bus mode to ensure both expanders are enabled at the same time, allowing the host to sense all drives on the bus using a single scan command. Transition path K2 thus avoids failures on the Host when half the drives may not be sensed if the expanders are not enabled at the same time. The Pseudo-Fault Secondary state 100 transitions K2 to Primary state 001 due to transition of Front status from Unconnected to Connected based on term power and the differential sense (diff_sense) signal activation. The K2 transition occurs when external primary signal (#PRI_BCC) is at a logic high indicating that no interface (BCC) has taken over Primary responsibilities. The K1 transition is useful when the enclosure is in Full Bus Mode since transitioning directly to Primary state 001 ensures that both expanders are enabled together allowing the host access to all disks on the bus. In an illustrative embodiment, firmware transitions the interface to the Primary state 001. For example, firmware claims Primary status by either driving the internal primary signal (#PRI_BCC) low. If #PRI_BCC is already low, the transition would be Pseudo-Fault Secondary state 100 to Secondary state 010. Firmware also drives the internal signal indicating primary status (#IAM_PRI) low. Firmware drives all shared elements to the proper level, and enables the proper expander based on the enclosure configuration. For example firmware can drive EH_WS_EN and EL_WS_EN high if BRDG_EN is high, drive EH_WS_EN high and EL_WS_EN low if BRDG_EN is low and #SLOTA is low, and otherwise drive EH_WS_EN low and EL_WS_EN high. The Front end bus reset is released, for example FRONT_SCSI_RESET is driven low.

The interface takes multiple actions upon detection of an interface (BCC) fault. For a particular condition, some actions may be redundant. Redundancy does not affect operation. For example, pseudo states already have expanders disabled so that actions affecting *_WS_EN signals do not change operations. In a transition from any state to the Fault state 111, a control device performs multiple actions. In an illustrative embodiment, a fault condition occurs when firmware fails self-test, FPGA code does not download, or conflicting sense signals occur. Upon failure, firmware drives an interface fault signal, for example by pulling #BCC_FLT_OUT low. The FPGA, if functioning, resets all buses, for example pulling high FRONT_SCSI_RST, LBACK_SCSI_RST, and HBACK_SCSI_RST. The FPGA, if functioning, drives the alarm visual signal LED on solid by driving high BCC_FLT_LED. Firmware soft disables the expanders by driving EH_WS_EN and EL_WS_EN low. In some systems, firmware may assert an FPGA fault signal (#FPGA_FLT_ASSERTED driven low) to indicate to the FPGA the occurrence of a board fault. The FPGA after a delay of 25 uS or more releases all bus resets, for example pulls high FRONT_SCSI_RST, LBACK_SCSI_RST, and HBACK_SCSI_RST. Firmware releases the internal primary status signal by tri-stating #BCC_PRI, drives the internal primary signal (#IAM_PRI) high, and turns the interface fault LED on solid by driving BCC_FLT_LED high.

Referring to FIG. 3, a state table illustrates how state is identified on power up based on interface position, front end connection, internal primary signal, fault, power up timing, external primary signal, peer interface, peer fault, and interface state. BCC Position indicates whether an interface card (BCC) is inserted into Slot A or Slot B. Slot A has priority over Slot B in determining which card becomes primary when other conditions do not give a priority.

Front End Connection indicates the configuration of a variety of configurations in which ports can be connected to hosts. A Proper Connection has at least one port connected to a host bus adapter (HBA) or terminator and the other port connected to a terminated HBA and has valid term power and diff_sense signals. An Improper Connection has only one port connected. An Unconnected Connection has no ports connected to anything, or both ports connected but no term power available. To determine front end connection status, a port can isolate one or more ground pins, pull the isolated ground pins high, and monitor the ground pins to determine whether a connection pulls the pins low.

Internal Primary Signal (#IAM_PRI) is affected by interface card state and take either High or Low levels. FIG. 3 depicts a transition of the internal primary signal as an arrow wherein the destination state is given in the Card State column.

A Fault signal indicative of whether the interface card is in a Fault condition or No Fault condition is driven by the interface card (BCC) and sent to the peer interface (BCC) over a cross backplane signal. The interface goes to a fault state when faulted and when the interface self-determines the faulted condition, regardless of other signals. An interface driving the external primary signal (#BCC_PRI) releases the signal in the event of a fault. If a nonfaulting peer interface detects a fault signal from the other interface but the faulting interface does not give up the external primary signal (#BCC_PRI), then the nonfaulting interface can issue an interface reset if reset functionality is available. On card faults are expanded in a truth table.

The Power Up Timer can have a Not Applicable value or Expired value, and is included to reinforce delay on an interface card in Slot B before sensing the slot B control line and determining the proper state. The delay allows the peer in slot A to have the first opportunity to become primary.

External Primary Signal (#BCC_PRI) can be High, Low, or transition from High to Low based on the state of interface transition. External Primary Signal is shared by both interfaces and is pulled up on the backplane. The interface card that drives #BCC_PRI low is the card in the Primary state. An arrow (–>) in the table shown in FIG. 3 indicates a transition of the signal based on a transition to the state in the previous column. An arrow (–>) indicates that the interface card is driving #BCC_PRI.

Peer BCC signal indicates whether the Peer interface (BCC) is Present or Not Present in the enclosure.

Peer Fault signal indicates that the Peer interface (BCC) has a Fault or has No Fault. If the interface card senses the Peer interface has a fault, then the sensing interface takes over a Primary or Pseudo-Primary with or without a Configuration Fault, depending on how the front end is connected.

Card State indicates the interface state definition and may include Primary, Secondary, Pseudo-Primary, Pseudo-Fault Primary, Pseudo-Secondary, Pseudo-Fault Secondary, or Fault states.

Some conditions cause interface status to change. Some conditions affect the response or reaction to a status transfer. In an illustrative embodiment, five causes of status transfers include loss of proper differential signal, removal of primary interface, removal of cable or terminator, properly connecting the front end of a secondary interface prior to a primary interface, and a primary interface fault. In a specific example, if the front end differential sense signal (FE_LVD_IND) leaves the low voltage differential (LVD) range for more than 200 ms, the interface (BCC) disables expanders to prevent data corruption. Both expanders of the interface (BCC) are disabled so that the secondary interface will take over Primary status to enable host access to all appropriate storage drives.

Upon removal of the primary interface (BCC), the remaining BCC assumes control over primary functions. Upon removal or a cable or terminator, the interface (BCC) disables expanders to prevent data corruption. Both expanders of the interface (BCC) are disabled so that the secondary interface will take over Primary status to enable host access to all appropriate storage drives.

The front end of a secondary interface can be properly connected before the primary BCC is connected in special cases such as when the enclosure is connected after power is applied. If neither the primary nor the secondary interface has any front end connections, then neither interface pulls the primary signal low. The interface card in slot A raises the internal interface card's internal primary signal #IAM_PRI, drives the LEDs, and is used as baseline for configuration switch settings. If the interface card in slot B is properly connected to a host before the interface card in slot A is connected, then the interface card in slot B takes over Primary card status and self-reconfigures based on the configuration (dip) switches.

If the primary interface self-determines a fault, then the interface relinquishes the primary status and self-isolates from the backplane. The isolated interface can continue to connect to the front end to permit sending status information to the host.

Actions taken to complete status transfer depend on configuration conditions including the secondary interface configuration and the enclosure configuration. A secondary interface can assume primary status if present with a proper front end connection. Status transfer can be completed if the enclosure is configured in full or split bus.

An interface responds to state changes for particular causes of status transfer and configuration conditions according to several matrices. In an illustrative embodiment, firmware and FPGA code implement logic of the matrices.

Referring to TABLE I, a matrix shows relevant conditions when a primary interface (BCC) loses a proper differential signal level (FE_LVD_IND).

TABLE I

| FE_LVD_IND lost on Primary | Secondary Card Present | Secondary Card Connected | Enclosure Configuration | Resulting Actions |
|---|---|---|---|---|
| 1 | Yes | No | Split | Action - 1 |
| 2 | Yes | No | Full | Action - 2 |
| 3 | Yes | Yes | Split | Action - 1 |
| 4 | Yes | Yes | Full | Action - 2 |
| 5 | No | N/A | Split | Action - 1 |
| 6 | No | N/A | Full | Action - 2 |

Cases 1 and 5 can be collapsed because the absence of a secondary interface card is the same in this case as having a secondary interface without proper connections to SCSI connectors. For the same reasons, cases 2 and 6 can be collapsed. However case 1/5 and 2/6 are different because responses to stimuli differ because SCSI bus reset is only applied to one SCSI bus in split bus mode while in full bus mode bothe SCSI buses are reset.

Figure 4:
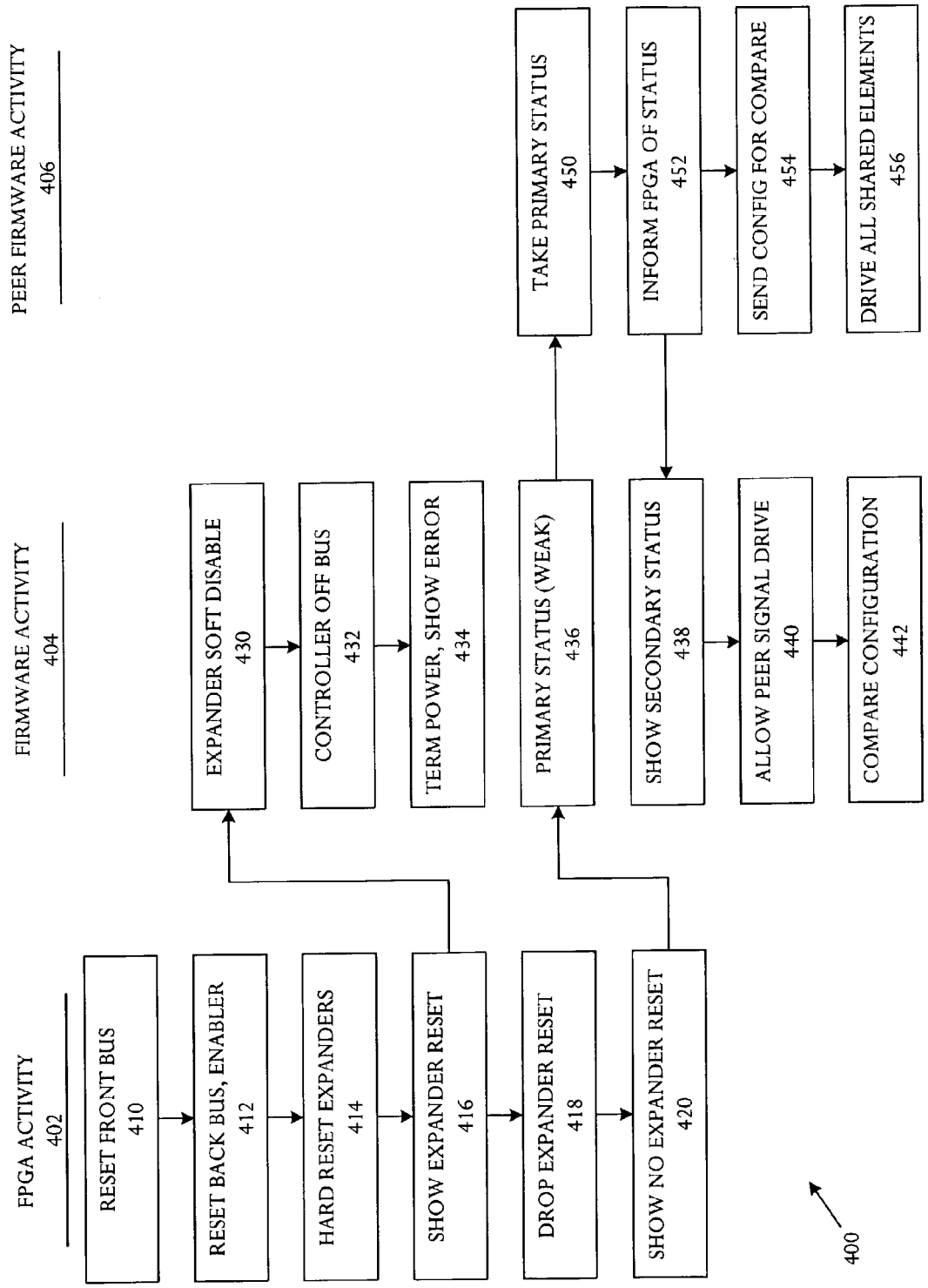
FIG. 4 is a flow chart that depicts actions that occur in response to loss of proper differential signal level (FE_LVD_IND) in a primary interface in split bus mode.

Referring to FIG. 4, a flow chart depicts actions that occur in Action-1 in response to loss of proper differential signal level (FE_LVD IND) in a primary interface in split bus mode. In an illustrative embodiment, a loss of proper differential signal level occurs when FE_LVD_IND signal is low for more than 100 ms or a loss of term power occurs indicating a change in the status of SCSI mode at the front end. In the illustrative embodiment, the action 400 comprises local interface FPGA activity 402, local interface firmware activity 404, and peer card firmware activity 406 that execute concurrently and generally independently but with some interactions to activate actions between processes.

In response to the loss of FE_LVD_IND signal level, the FPGA activity 402 resets the front SCSI bus (FRONT_SCSI_RST) for 25 uS 410. The FPGA 402 resets the back SCSI bus (LBACK_SCSI_RST or HBACK_SCSI_RST) associated with the enabled expander (EL_WS_ENABLE or EH_WS_ENABLE) for 25 uS 412. The FPGA 402 hard resets the expanders, driving #EXP_RST low, before the 25 uS expires and hosts the reset 414. FPGA 402 indicates that the expanders are hard reset by driving EXP_RST_055 high 416, activating local firmware activity 404.

In response to EXP_RST being high and FE_LVD_IND being low, firmware 404 soft disables the expanders by driving EL_WS_EN or EH_WS_EN low 430. Firmware 404 disconnects the interface controller from the SCSI bus 432. If term power remains present, firmware 404 activates the BCC fault LED 434 indicating a configuration error.

FPGA 402 drives the #EXP_RST high 418, dropping the expander hard reset when the FPGA 402 detects a low signal on EL_WS_EN or EH_WS_EN. FPGA 402 drives EXP_RST_055 low indicating the expanders are no longer hard reset 420.

Firmware 404 tri-states the #PRI_BCC_OUT signal while allowing the #IAM_PRI signal to remain high 436, indicating that the interface maintains primary status but can allow the peer interface to take primary status if configured properly. Firmware 404 continues to monitor #PRI_BCC_IN signal to determine whether the peer interface (BCC) takes over primary status.

Peer interface firmware 406 senses the #PRI_BCC signal transition to high. If the secondary interface has proper front end connections, indicated by J1_CONN_STATA, J1_CONN_STATB, J2_CONN_STATA, J2_CONN_STATB, and FE_LVD_IND, the peer interface drives #PRI_BCC signal low 450, taking over primary status. Peer interface firmware 406 also drives #IAM_PRI signal low 452, communicating the FPGA 402 that the peer interface has taken primary status. Peer interface firmware 406 sends DIP switch settings to the local interface (BCC) 454.

In response to #PRI_BCC_IN signal driven low indicating primary status of the peer interface, firmware 404 releases #IAM_PRI signal 438 indicating local interface secondary status. When FPGA 402 senses the #IAM_PRI signal transition to high, firmware 404 tri-states the shared LEDs and buzzer signals 440 to allow the peer interface to drive the alarm signals. The local interface (BCC) firmware 404 compares DIP switch settings to the configuration settings of the secondary interface and flashes the fault LED if the switches fail to match 442.

Peer interface firmware 406 drives shared elements including LEDs and the buzzer to an appropriate level 456. Because the configuration is in split bus mode, expander conditions do not change.

Figure 5:
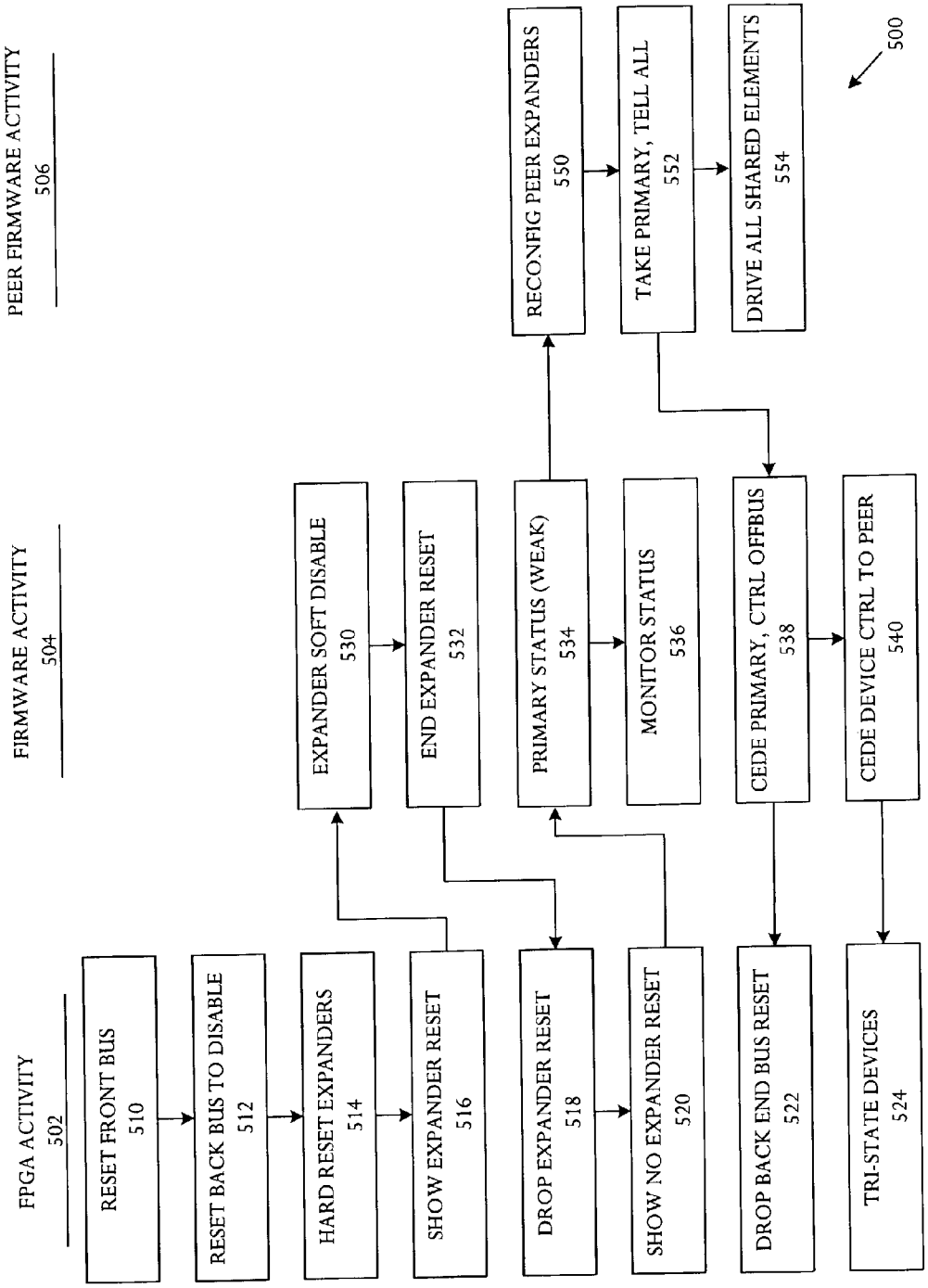
FIG. 5 is a flow chart that depicts actions that occur in response to loss of proper differential signal level (FE_LVD_IND) in a primary interface in full bus mode.

Referring to FIG. 5, a flow chart depicts actions that occur in Action-2 in response to loss of proper differential signal level (FE_LVD_IND) in a primary interface in full bus mode. In an illustrative embodiment, a loss of proper differential signal level occurs when FE_LVD_IND signal is low for more than 100 ms or a loss of term power occurs indicating a change in the status of SCSI mode at the front end. In the illustrative embodiment, the action 500 comprises local interface FPGA activity 502, local interface firmware activity 504, and peer card firmware activity 506 that execute concurrently and generally independently but with some interactions to activate actions between processes.

In response to the loss of FE_LVD_IND signal level, the FPGA activity 502 resets the front SCSI bus (FRONT_SCSI_RST) for 25 uS 510. The FPGA 502 resets the back SCSI bus (LBACK_SCSI_RST and HBACK_SCSI_RST) until local interface firmware generates a command to disable 512. The full bus configuration is known because EL_WS_ENABLE and EH_WS_ENABLE will be high. The FPGA 502 hard resets the expanders, driving #EXP_RST low, before the 25 uS expires and hosts the reset 514. FPGA 502 indicates that the expanders are hard reset by driving EXP_RST_055 high 516, activating local firmware activity 504.

In response to EXP_RST being high and FE_LVD_IND being low, firmware 504 soft disables the expanders by driving EL_WS_EN or EH_WS_EN low 530. Firmware 504 sends a command over the pseudo-bus 532 instructing the FPGA 502 to drop the hard reset. Alternatively, the FPGA 502 can monitor the soft enable signals to drop the hard reset when the FPGA senses the expanders are soft enabled.

FPGA 502 drives the #EXP_RST high 518, dropping the expander hard reset. FPGA 502 drives EXP_RST_055 low indicating the expanders are no longer hard reset 520.

Firmware 504 tri-states the #PRI_BCC_OUT signal while allowing the #IAM_PRI signal to remain high 534, indicating that the interface maintains primary status but can allow the peer interface to take primary status if configured properly. Firmware 504 continues to monitor #PRI_BCC_IN signal to determine whether the peer interface (BCC) takes over primary status.

Peer interface firmware 506 senses the #PRI_BCC signal transition to high. If the secondary interface has proper front end connections, indicated by J1_CONN_STATA, J1_CONN_STATB, J2_CONN_STATA, J2_CONN_STATB, and FE_LVD_IND, the peer interface firmware 506 reconfigures expanders 550 ensuring both are enabled. Peer interface firmware 506 drives the #PRI_BCC signal low 552 taking over primary status. Peer interface firmware 506 also drives #IAM_PRI signal low 552, communicating the FPGA 502 that the peer interface has taken primary status. Peer interface firmware 506 performs a DIP switch configuration check and drives all shared LEDs and buzzers to an appropriate level 554.

In response to #PRI_BCC_IN signal driven low indicating primary status of the peer interface, firmware 504 releases #IAM_PRI signal 536 indicating local interface secondary status. Firmware also disconnects the interface controller from the SCSI bus and sends a command to the FPGA 502 to release the SCSI bus reset on the back end 538.

FPGA 502 drops back end SCSI resets 522.

When FPGA 502 senses the #IAM_PRI signal transition to high, firmware 504 sends a command to tri-state the shared LEDs and buzzer signals 540 to allow the peer interface to drive the alarm signals.

FPGA 502 tri-states all common LEDs and buzzers 524.

TABLE I also describes a matrix for removal of a cable or terminator. Signals that trigger the transfer are J1_CONN_STATA, J1_CONN_STATB, J2_CONN_STATA, J2_CONN_STATB, and FE_LVD_IND.

Referring to TABLE II, a matrix shows relevant conditions when a secondary interface card loses the differential signal (FE_LVD_IND).

TABLE II

Figure 6:
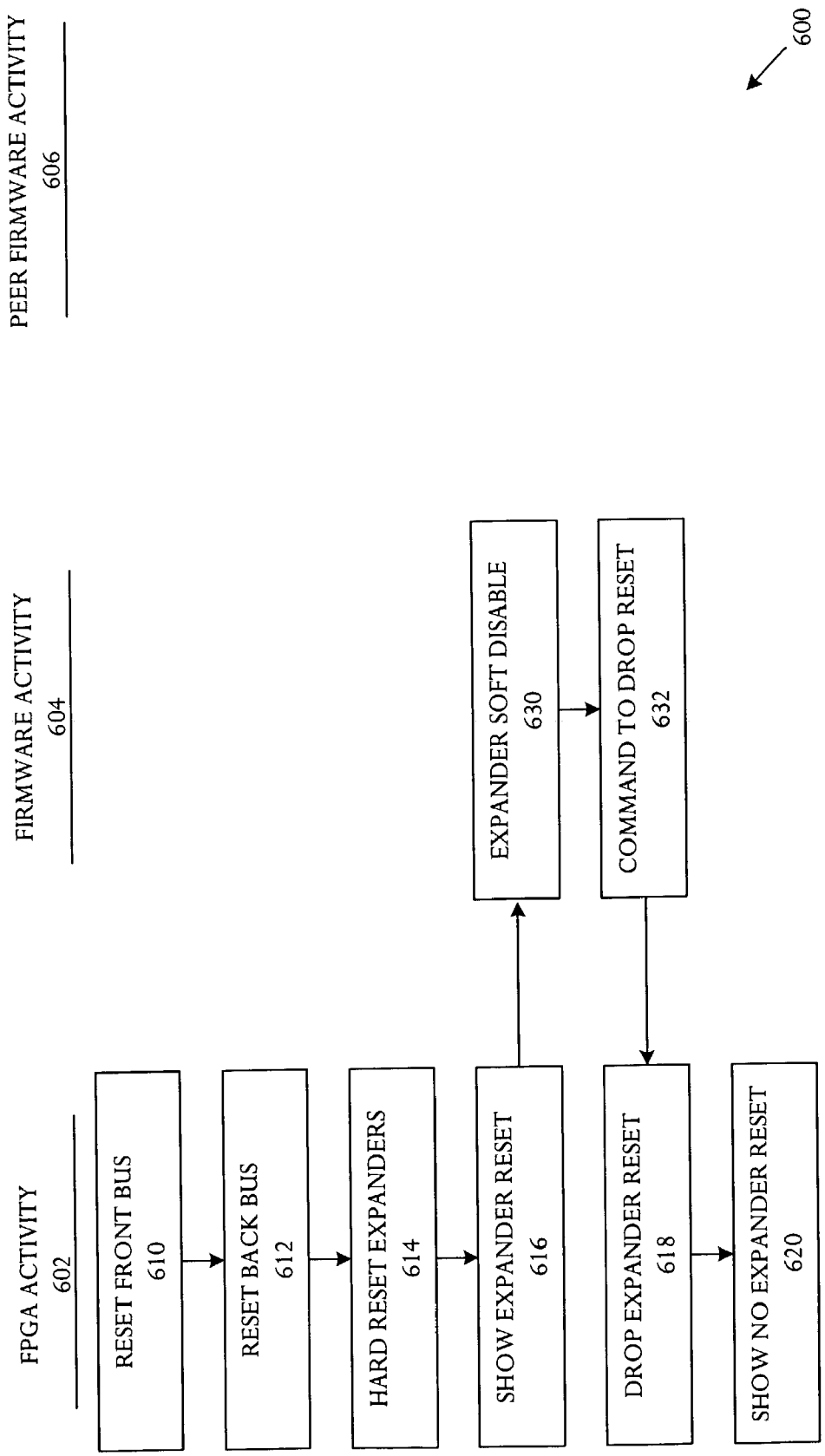
FIG. 6 is a flow chart showing actions that occur when a secondary interface card loses a proper differential signal level (FE_LVD_IND).

| FE_LVD_IND lost on Secondary | Enclosure Configuration | Resulting Actions |
|---|---|---|
| 1 | Split | Action - 3 |
| 2 | Full | Action - 3 | conditions 1 and 2 can be consolidated because the secondary interface can have only one expander activated at one time. The resulting action, Action-3 as described in the flow chart shown in FIG. 6, resets the affected SCSI bus, hard disables the expanders, releases the SCSI reset, and waits for firmware to command removal of the hard reset. Action-3 results when FE_LVD_IND signal is low for more than 100 ms or term power is lost indicating a change in status of SCSI mode at the front end. Action-3 is applicable for the secondary interface card either in full bus mode or split bus mode. Secondary mode is identified by a high #IAM_PRI signal. In the illustrative embodiment, Action-3 600 comprises local interface FPGA activity 602, local interface firmware activity 604, and peer card firmware activity 606 that execute concurrently and generally independently but with some interactions to activate actions between processes.

FPGA 602 resets the front SCSI bus 610 (FRONT_SCSI_RST) for 25 uS and resets the affected back SCSI bus, LBACK_SCSI_RST or HBACK_SCSI_RST, for 25 uS 612. FPGA 602 hard resets the expanders 614 by driving #EXP_RST low, before the SCSI but reset expires, then holds the reset. FPGA 602 indicates that the expanders are hard reset 616 by driving EXP_RST_055 high.

In response to EXP_RST_055 being high and FE_LVD_IND being low or term power being low, firmware 604 soft disables expanders 630 by driving EL_WS_EN or EH_WS_EN low. Firmware 604 sends a command 632 over the pseudo-bus instructing the FPGA 602 to drop the hard reset when the FPGA senses the expanders are soft disabled.

FPGA 602 drives the #EXP_RST high 618, dropping the expander hard reset. FPGA 602 drives the EXP_RST_055 low 620, indicating the expanders are no longer hard reset.

Referring to TABLE III, a matrix shows relevant conditions on removal of a primary interface card (BCC). An interface detects removal via a #PEER_DET signal.

TABLE III

| Primary BCC Removed | Secondary Card Connected | Enclosure Configuration | Resulting Actions |
|---|---|---|---|
| 1 | Yes | Split | Action - 4 |
| 2 | Yes | Full | Action - 4 |
| 3 | No | Split | N/A |
| 4 | No | Full | N/A |

Conditions 1 and 2 can be consolidated because removal of an interface (BCC) affects both SCSI buses so that both are to be reset. Reset remains static until the secondary interface (BCC) obtains primary status and self-reconfigures. Conditions 3 and 4 can be discounted since the interface (BCC) is removed and no SCSI connections remain between enclosure and host, and no controller card is available to rest the bus.

Removal of a secondary interface card from the enclosure has limited consequence. A SCSI bus reset occurs on all buses for at least 25 uS. The primary interface remains operative without reconfiguration.

Figure 7:
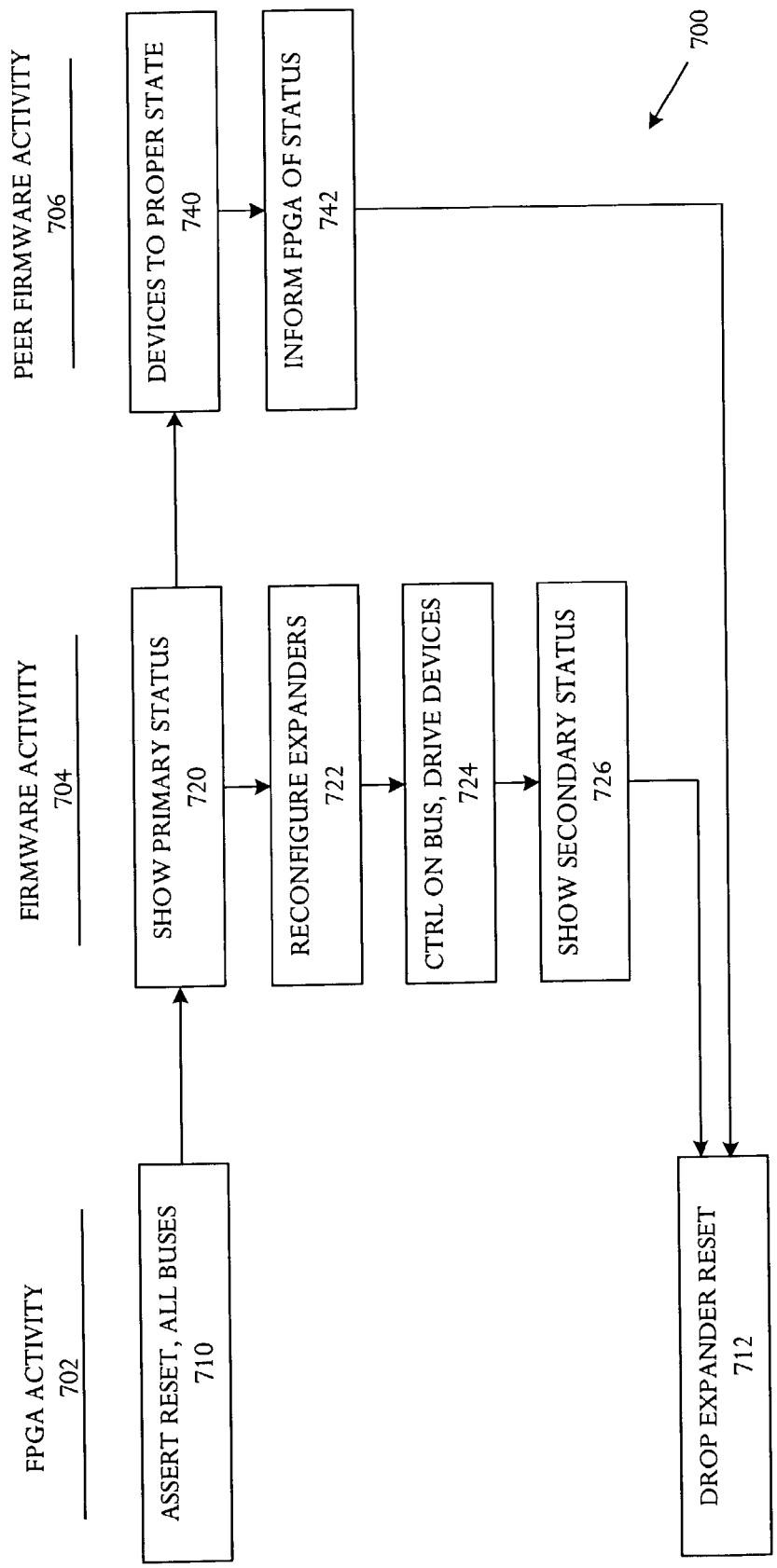
FIG. 7 is a flow chart depicting an action resulting from removal of the primary interface as indicated by the #Peer_Det signal transition from low to high.

Referring to FIG. 7, a flow chart depicts Action-4 700 which results from removal of the primary interface as indicated by the #Peer_Det signal transition from low to high. Action-4 700 is applicable for a secondary interface (BCC) card in full or split bus secondary mode, identified by a high #IAM_PRI signal. In the illustrative embodiment, Action-4 700 comprises a secondary interface FPGA activity 702, secondary interface firmware activity 704, and firmware activity 706 of a peer interface (BCC) if the secondary interface is not properly connected. The activities execute concurrently and generally independently but with some interactions to activate actions between processes.

The FPGA 702 asserts bus reset on all buses 710 (FRONT_SCSI_RST, HBACK_SCSI_RST, and LBACK_SCSI_RST) and holds the reset. The secondary interface firmware 704 senses the #PRI_BCC and #PEER_DET signals high transition and responds 720. If the interface (BCC) has proper front connections indicated by J1_CONN_STATA, J1_CONN_STATB, J2_CONN_STATA, J2_CONN_STATB, and FE_LVD_IND, then firmware 704 drives #PRI_BCC low, indicating primary status.

If the secondary interface card is not properly connected, the peer interface firmware 706 drives shared elements including LEDs and buzzers to a proper state 740 based on current status page information.

Firmware 704 reconfigures the expanders, EL_WS_EN and/or EH_WS_EN, based on configuration signal BRDG_EN 722. Secondary interface firmware 704 connects the interface controller onto the SCSI bus 724 and drives shared elements including LEDs and buzzers to an appropriate state based on the current status page information. The secondary interface firmware 704 also drives the #IAM_PRI signal low 726 informing the FPGA 702 that the interface card has primary status.

For an improperly connected secondary interface, the peer firmware 706 drives the #IAM_PRI signal low 742 informing the FPGA 702 that the interface card has primary status.

FPGA 702 drives the #EXP_RST high 712, dropping the expander hard reset.

Referring to TABLE IV, a matrix shows relevant conditions for properly connecting the front end of a secondary interface (BCC) before connecting the primary interface.

Specifically, the example relates to a front end connection of a pseudo-secondary BCC prior to a pseudo-primary BCC connection.

TABLE IV

| Secondary Card properly Connected before Primary Card | Enclosure Configuration | Resulting Actions |
|---|---|---|
| 1 | Split | Action - 5 |
| 2 | Full | Action - 5 |

The action of properly configuring the front end arises from a preceding condition that neither interface (BCC) is properly connected. The interface (BCC) in slot A has taken pseudo-primary responsibilities and is driving common elements and has sent configuration status to the secondary interface over an I2C bus so that a configuration (DIP) switch comparison can be done. Neither interface has enabled expanders or allowed respective interface controllers to connect to the SCSI bus.

Figure 8:
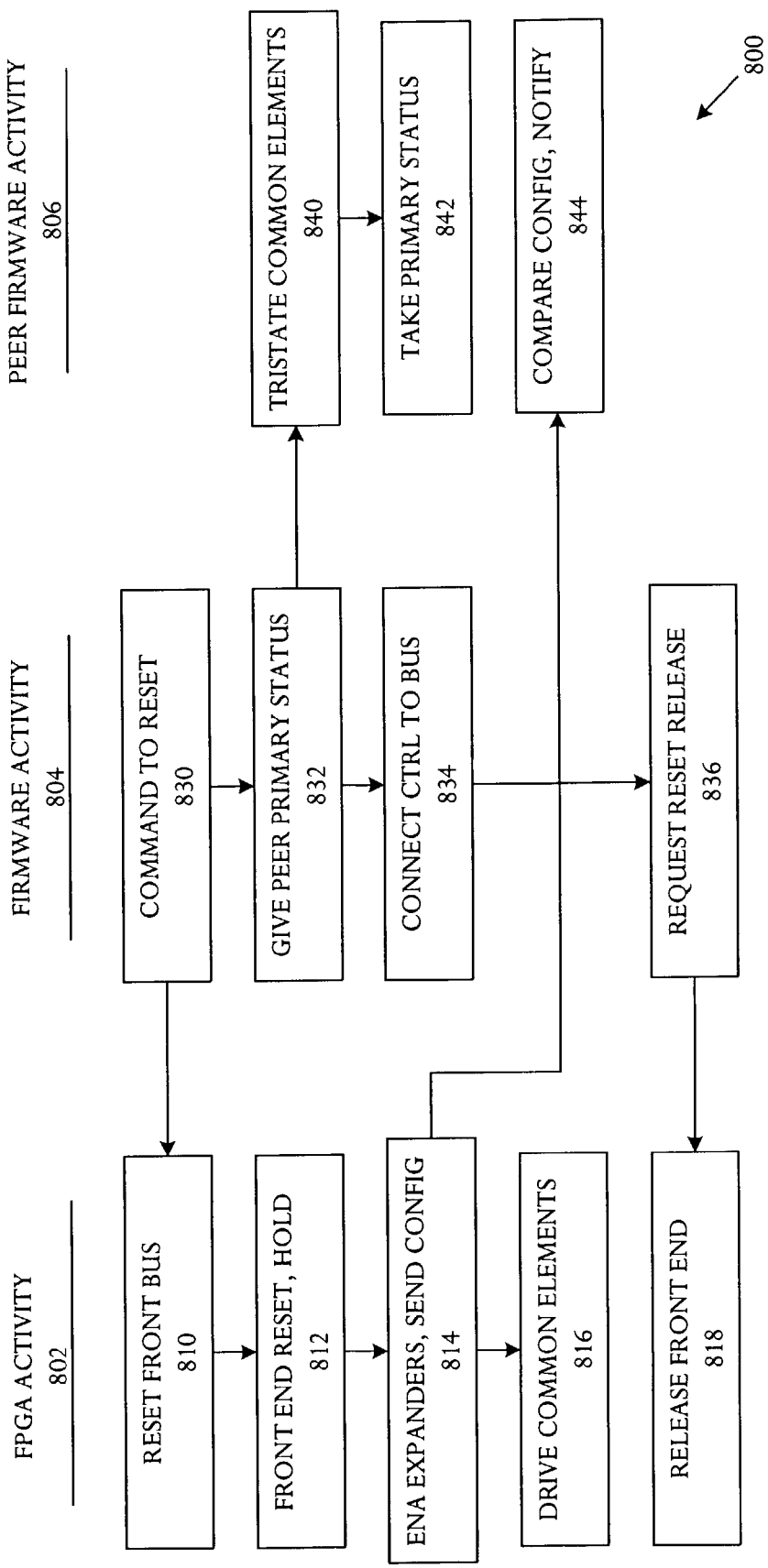
FIG. 8 is a flow chart showing actions that result when a proper connection of the secondary interface precedes connection of the pseudo-primary interface.

Referring to FIG. 8, a flow chart show Action-5 800 that results when a proper connection of the secondary BCC precedes connection of the pseudo-primary BCC. Action-5 800 applies for a secondary interface (BCC) card in full or split bus mode with J*_CONN_STAT*, FE_LVD_IND, and term power signals indicating a proper connection. In the illustrative embodiment, Action-5 800 comprises local secondary interface FPGA activity 802, local secondary interface firmware activity 804, and firmware activity 806 of a peer interface (BCC). The activities execute concurrently and generally independently but with some interactions to activate actions between processes.

In the local interface FPGA 802, #PRI_BCC is high indicating no interface card has officially taken primary status. #PEER_DET signal remains low indicating presence of a card in slot A performing pseudo-primary activities.

Local secondary interface firmware 804 sends a command 830 to the FPGA 802 to reset the front SCSI bus 810.

FPGA 802 drives FRONT_SCSI_RST signal high 812 to issue a SCSI reset on the front end and holds the SCSI reset until firmware 804 sends a command to drop reset.

Firmware 804 drives the #PRI_BCC signal low 832 indicating the secondary interface card is taking over primary status.

Peer interface firmware 806 responds to the low transition of #PRI_BCC by tri-stating common elements 840. Peer firmware 806 drives the #IAM_PRI signal high, or may tri-state #IAM_PRI causing #IAM_PRI to pull high 842.

Secondary interface firmware 804 connects the secondary interface controller to the SCSI bus 834.

Secondary FPGA 802 enables expanders 814 based on the BRDG_EN signal, and sends configuration (DIP) switch information to the peer interface (BCC) over the I2C bus for the peer firmware 806 to compare configuration information. FPGA 802 drives common elements including LEDs and buzzers based on the current status page information 816.

Peer interface firmware 806 compares configuration switch information and flashes a fault LED and sounds a buzzer for a few seconds if a mismatch occurs 844.

Firmware 804 drives the #IAM_PRI signal low 836, informing the FPGA to release the reset.

FPGA 802 releases the front end SCSI reset (FRONT_SCSI_RST) 818.

A control element such as firmware or FPGA code can detect signal inconsistencies that cause an on-board fault (BCC_FLT_OUT) due to conflicting information about interface card setup. Inconsistency faults include a conditions of: (1) presence of front end low voltage differential, loss of term power, and one more of the two connectors connected, (2) term power present with the two connectors disconnected, and (3) Peer interface selected with interface primary in delected and interface primary out tri-stated. The logical statement of the inconsistency fault condition is:

BCC_FLT OUT=(FE_LVD_
IND*!TP*CONA*!CONB)+(FE_LVD_
IND*!TP*!CONA*CONB)+(FE_LVD_
IND*!TP*CONA*CONB)+
(TP*!CONA*!CONB)+(#PEER_BCC*!#BCC_
PRI_IN*#BCC_PRI_OUT(tri-stated)))

Referring to TABLEs V(a)–V(f), a plurality of Next State Tables depict an example of an Card Status Algorithm implementation and show "next states" for possible signal configurations. The legend for Card Status Next State Tables includes a Front End Connection Definition and a Card State Definition. The Front End Connection definitions include Connected (00), Not Connected (01), Improperly Connected (10), and Fault (11) conditions. The Card State Definition includes Power Up (000), Primary (001), Secondary (010), Pseudo-Fault-Primary (011), Pseudo-Fault-Secondary (100), Pseudo-Primary (101), Pseudo-Secondary (110), and Fault (111). In TABLEs V(a)–V(f), bold indicates a next Fault state. TABLEs V(a) show Card Status Next State tables where the current state is Power Up.

TABLE V(a)(1)

| BCC Position | Front End Connection | External Primary Signal | Peer BCC | Current Card State | Next Card State |
|---|---|---|---|---|---|
| 0 | 0 | 0 | 0 | 000 | 010 |
| 0 | 0 | 0 | 1 | 000 | 111 |
| 0 | 0 | 0 | 1 | 000 | 001 |
| 0 | 0 | 0 | 1 | 000 | 001 |
| 0 | 0 | 1 | 0 | 000 | 110 |
| 0 | 0 | 1 | 0 | 000 | 111 |
| 0 | 0 | 1 | 1 | 000 | 101 |
| 0 | 0 | 1 | 1 | 000 | 101 |
| 0 | 1 | 0 | 0 | 000 | 100 |
| 0 | 1 | 0 | 0 | 000 | 111 |
| 0 | 1 | 0 | 1 | 000 | 011 |
| 0 | 1 | 0 | 1 | 000 | 011 |
| 0 | 1 | 1 | 0 | 000 | 111 (Fault) |
| 0 | 1 | 1 | 0 | 000 | 111 (Fault) |
| 0 | 1 | 1 | 1 | 000 | 111 (Fault) |
| 0 | 1 | 1 | 1 | 000 | 111 (Fault) |
| 1 | 0 | 0 | 0 | 000 | 010 |
| 1 | 0 | 0 | 1 | 000 | 111 |
| 1 | 0 | 0 | 1 | 000 | 001 |
| 1 | 0 | 0 | 1 | 000 | 001 |
| 1 | 0 | 1 | 0 | 000 | 110 |
| 1 | 0 | 1 | 1 | 000 | 111 |
| 1 | 0 | 1 | 0 | 000 | 110 |
| 1 | 0 | 1 | 1 | 000 | 101 |
| 1 | 1 | 0 | 0 | 000 | 100 |
| 1 | 1 | 0 | 1 | 000 | 111 |
| 1 | 1 | 0 | 0 | 000 | 100 |
| 1 | 1 | 0 | 1 | 000 | 011 |
| 1 | 1 | 1 | 0 | 000 | 111 (Fault) |
| 1 | 1 | 1 | 1 | 000 | 111 (Fault) |
| 1 | 1 | 1 | 0 | 000 | 111 (Fault) |
| 1 | 1 | 1 | 1 | 000 | 111 (Fault) |

TABLE V(a)(1)

| Current Conditions | Next State |
|---|---|
| ?011?000 | :NXT_STATE <= 001; (Primary) |

TABLE V(a)(1)-continued

| Current Conditions | Next State |
|---|---|
| ?0000000 | :NXT_STATE <= 010; (Secondary) |
| 0101?000 or 11011000 | :NXT_STATE <= 011; (Pseudo-Fault-Primary) |
| 110?0000 or 01000000 | :NXT_STATE <= 100; (Pseudo-Fault-Secondary) |
| 011?000 or 10111000 | :NXT_STATE <= 101; (Pseudo-Primary) |
| 10110000 or ?0100000 | :NXT_STATE <= 110; (Pseudo-Secondary) |
| ?11????? or ???01000 (some overlap) | :NXT_STATE <= 111; (Fault) |

TABLEs V(b) show Card Status Next State tables where the current state is Primary.

TABLE V(b)(1)

| BCC Position | Front End Connection | External Primary Signal | Peer BCC | Current Card State | Next Card State |
|---|---|---|---|---|---|
| 0 | 0 | 0 | 0 | 0 | 001 | 001 |
| 0 | 0 | 0 | 0 | 1 | 001 | 001 |
| 0 | 0 | 0 | 1 | 0 | 001 | 001 |
| 0 | 0 | 0 | 1 | 1 | 001 | 001 |
| 0 | 0 | 1 | 0 | 0 | 001 | 101 |
| 0 | 0 | 1 | 0 | 1 | 001 | 101 |
| 0 | 0 | 1 | 1 | 0 | 001 | 101 |
| 0 | 0 | 1 | 1 | 1 | 001 | 101 |
| 0 | 1 | 0 | 0 | 0 | 001 | 011 |
| 0 | 1 | 0 | 0 | 1 | 001 | 011 |
| 0 | 1 | 0 | 1 | 0 | 001 | 011 |
| 0 | 1 | 0 | 1 | 1 | 001 | 011 |
| 0 | 1 | 1 | 0 | 0 | 001 | 111 (Fault) |
| 0 | 1 | 1 | 0 | 1 | 001 | 111 (Fault) |
| 0 | 1 | 1 | 1 | 0 | 001 | 111 (Fault) |
| 0 | 1 | 1 | 1 | 1 | 001 | 111 (Fault) |
| 1 | 0 | 0 | 0 | 0 | 001 | 001 |
| 1 | 0 | 0 | 0 | 1 | 001 | 001 |
| 1 | 0 | 0 | 1 | 0 | 001 | 001 |
| 1 | 0 | 0 | 1 | 1 | 001 | 001 |
| 1 | 0 | 1 | 0 | 0 | 001 | 101 |
| 1 | 0 | 1 | 0 | 1 | 001 | 101 |
| 1 | 0 | 1 | 1 | 0 | 001 | 101 |
| 1 | 0 | 1 | 1 | 1 | 001 | 101 |
| 1 | 1 | 0 | 0 | 0 | 001 | 011 |
| 1 | 1 | 0 | 0 | 1 | 001 | 011 |
| 1 | 1 | 0 | 1 | 0 | 001 | 011 |
| 1 | 1 | 0 | 1 | 1 | 001 | 011 |
| 1 | 1 | 1 | 0 | 0 | 001 | 111 (Fault) |
| 1 | 1 | 1 | 0 | 1 | 001 | 111 (Fault) |
| 1 | 1 | 1 | 1 | 0 | 001 | 111 (Fault) |
| 1 | 1 | 1 | 1 | 1 | 001 | 111 (Fault) |

TABLE V(b)(1)

| Current Conditions | Next State |
|---|---|
| ?00??001 | :NXT_STATE <= 001; (Primary) |
|  | :NXT_STATE <= 010; (Secondary) |
| ?10??001 | :NXT_STATE <= 011; (Pseudo-Fault-Primary) |
|  | :NXT_STATE <= 100; (Pseudo-Fault-Secondary) |
| ?01??001 | :NXT_STATE <= 101; (Pseudo-Primary) |
|  | :NXT_STATE <= 110; (Pseudo-Secondary) |

TABLE V(b)(1)-continued

| Current Conditions | Next State |
|---|---|
| ?11????? | :NXT_STATE <= 111; (Fault) |

TABLEs V(c) show Card Status Next State tables where the current state is Secondary.

TABLE V(c)(1)

| BCC Position | Front End Connection | External Primary Signal | Peer BCC | Current Card State | Next Card State |
|---|---|---|---|---|---|
| 0 | 0 | 0 | 0 | 0 | 010 | 010 |
| 0 | 0 | 0 | 0 | 1 | 010 | 001 |
| 0 | 0 | 0 | 1 | 0 | 010 | 001 |
| 0 | 0 | 0 | 1 | 1 | 010 | 001 |
| 0 | 0 | 1 | 0 | 0 | 010 | 110 |
| 0 | 0 | 1 | 0 | 1 | 010 | 111 |
| 0 | 0 | 1 | 1 | 0 | 010 | 111 |
| 0 | 0 | 1 | 1 | 1 | 010 | 111 |
| 0 | 1 | 0 | 0 | 0 | 010 | 100 |
| 0 | 1 | 0 | 0 | 1 | 010 | 111 |
| 0 | 1 | 0 | 1 | 0 | 010 | 111 |
| 0 | 1 | 0 | 1 | 1 | 010 | 111 |
| 0 | 1 | 1 | 0 | 0 | 010 | 111 (Fault) |
| 0 | 1 | 1 | 0 | 1 | 010 | 111 (Fault) |
| 0 | 1 | 1 | 1 | 0 | 010 | 111 (Fault) |
| 0 | 1 | 1 | 1 | 1 | 010 | 111 (Fault) |
| 1 | 0 | 0 | 0 | 0 | 010 | 010 |
| 1 | 0 | 0 | 0 | 1 | 010 | 001 |
| 1 | 0 | 0 | 1 | 0 | 010 | 001 |
| 1 | 0 | 0 | 1 | 1 | 010 | 001 |
| 1 | 0 | 1 | 0 | 0 | 010 | 110 |
| 1 | 0 | 1 | 0 | 1 | 010 | 111 |
| 1 | 0 | 1 | 1 | 0 | 010 | 111 |
| 1 | 0 | 1 | 1 | 1 | 010 | 111 |
| 1 | 1 | 0 | 0 | 0 | 010 | 100 |
| 1 | 1 | 0 | 0 | 1 | 010 | 111 |
| 1 | 1 | 0 | 1 | 0 | 010 | 111 |
| 1 | 1 | 0 | 1 | 1 | 010 | 111 |
| 1 | 1 | 1 | 0 | 0 | 010 | 111 (Fault) |
| 1 | 1 | 1 | 0 | 1 | 010 | 111 (Fault) |
| 1 | 1 | 1 | 1 | 0 | 010 | 111 (Fault) |
| 1 | 1 | 1 | 1 | 1 | 010 | 111 (Fault) |

TABLE V(c)(1)

| Current Conditions | Next State |
|---|---|
| ?001?010 or ?0001010 | :NXT_STATE <= 001; (Primary) |
| ?0000010 | :NXT_STATE <= 010; (Secondary) |
|  | :NXT_STATE <= 011; (Pseudo-Fault-Primary |
| ?1000010 | :NXT_STATE <= 100; (Pseudo-Fault-Secondary |
|  | :NXT_STATE <= 101; (Pseudo-Primary) |
| ?0100010 | :NXT_STATE <= 110; (Pseudo-Secondary) |
| ?11????? or ?011?010 or ?0101010 or ?101?010 or ?1001010 | :NXT_STATE <= 111; (Fault) |

TABLEs V(d) show Card Status Next State tables where the current state is Pseudo-Fault-Primary.

TABLE V(d)(1)

| BCC Position | Front End Connection | External Primary Signal | Peer BCC | Current Card State | Next Card State |
|---|---|---|---|---|---|
| 0 | 0 | 0 | 0 | 0 | 011 | 111 |
| 0 | 0 | 0 | 0 | 1 | 011 | 111 |
| 0 | 0 | 0 | 1 | 0 | 011 | 001 |
| 0 | 0 | 0 | 1 | 1 | 011 | 001 |
| 0 | 0 | 1 | 0 | 0 | 011 | 111 |
| 0 | 0 | 1 | 0 | 1 | 011 | 111 |
| 0 | 0 | 1 | 1 | 0 | 011 | 101 |
| 0 | 0 | 1 | 1 | 1 | 011 | 101 |
| 0 | 1 | 0 | 0 | 0 | 011 | 100 |
| 0 | 1 | 0 | 0 | 1 | 011 | 111 |
| 0 | 1 | 0 | 1 | 0 | 011 | 011 |
| 0 | 1 | 0 | 1 | 1 | 011 | 011 |
| 0 | 1 | 1 | 0 | 0 | 011 | 111 (Fault) |
| 0 | 1 | 1 | 0 | 1 | 011 | 111 (Fault) |
| 0 | 1 | 1 | 1 | 0 | 011 | 111 (Fault) |
| 0 | 1 | 1 | 1 | 1 | 011 | 111 (Fault) |
| 1 | 0 | 0 | 0 | 0 | 011 | 111 |
| 1 | 0 | 0 | 0 | 1 | 011 | 111 |
| 1 | 0 | 0 | 1 | 0 | 011 | 111 |
| 1 | 0 | 0 | 1 | 1 | 011 | 001 |
| 1 | 0 | 1 | 0 | 0 | 011 | 111 |
| 1 | 0 | 1 | 0 | 1 | 011 | 111 |
| 1 | 0 | 1 | 1 | 0 | 011 | 111 |
| 1 | 0 | 1 | 1 | 1 | 011 | 101 |
| 1 | 1 | 0 | 0 | 0 | 011 | 111 |
| 1 | 1 | 0 | 0 | 1 | 011 | 111 |
| 1 | 1 | 0 | 1 | 0 | 011 | 100 |
| 1 | 1 | 0 | 1 | 1 | 011 | 011 |
| 1 | 1 | 1 | 0 | 0 | 011 | 111 (Fault) |
| 1 | 1 | 1 | 0 | 1 | 011 | 111 (Fault) |
| 1 | 1 | 1 | 1 | 0 | 011 | 111 (Fault) |
| 1 | 1 | 1 | 1 | 1 | 011 | 111 (Fault) |

TABLE V(d)(1)

| Current Conditions | Next State |
|---|---|
| 0001?011 or 10011011 | :NXT_STATE <= 001; (Primary) |
| | :NXT_STATE <= 010; (Secondary) |
| 0101?011 or 11011011 | :NXT_STATE <= 011; (Pseudo-Fault-Primary) |
| 01000011 or 11010011 | :NXT_STATE <= 100; (Pseudo-Fault-Secondary) |
| 0011?011 or 10111011 | :NXT_STATE <= 101; (Pseudo-Primary) |
| | :NXT_STATE <= 110; (Pseudo-Secondary) |
| ?11????? or ?0?0?011 or 01001011 or 10?10011 | :NXT_STATE <= 111; (Fault) |

TABLEs V(e) show Card Status Next State tables where the current state is Pseudo-Fault-Secondary.

TABLE V(e)(1)

| BCC Position | Front End Connection | External Primary Signal | Peer BCC | Current Card State | Next Card State |
|---|---|---|---|---|---|
| 0 | 0 | 0 | 0 | 0 | 100 | 010 |
| 0 | 0 | 0 | 0 | 1 | 100 | 111 |
| 0 | 0 | 0 | 1 | 0 | 100 | 111 |
| 0 | 0 | 0 | 1 | 1 | 100 | 111 |
| 0 | 0 | 1 | 0 | 0 | 100 | 110 |
| 0 | 0 | 1 | 0 | 1 | 100 | 111 |
| 0 | 0 | 1 | 1 | 0 | 100 | 111 |
| 0 | 0 | 1 | 1 | 1 | 100 | 111 |
| 0 | 1 | 0 | 0 | 0 | 100 | 100 |
| 0 | 1 | 0 | 0 | 1 | 100 | 111 |
| 0 | 1 | 0 | 1 | 0 | 100 | 011 |
| 0 | 1 | 0 | 1 | 1 | 100 | 011 |
| 0 | 1 | 1 | 0 | 0 | 100 | 111 (Fault) |
| 0 | 1 | 1 | 0 | 1 | 100 | 111 (Fault) |
| 0 | 1 | 1 | 1 | 0 | 100 | 111 (Fault) |
| 0 | 1 | 1 | 1 | 1 | 100 | 111 (Fault) |
| 1 | 0 | 0 | 0 | 0 | 100 | 010 |
| 1 | 0 | 0 | 0 | 1 | 100 | 111 |
| 1 | 0 | 0 | 1 | 0 | 100 | 001 |
| 1 | 0 | 0 | 1 | 1 | 100 | 111 |
| 1 | 0 | 1 | 0 | 0 | 100 | 110 |
| 1 | 0 | 1 | 0 | 1 | 100 | 111 |
| 1 | 0 | 1 | 1 | 0 | 100 | 110 |
| 1 | 0 | 1 | 1 | 1 | 100 | 100 |
| 1 | 1 | 0 | 0 | 0 | 100 | 111 |
| 1 | 1 | 0 | 0 | 1 | 100 | 100 |
| 1 | 1 | 0 | 1 | 0 | 100 | 100 |
| 1 | 1 | 0 | 1 | 1 | 100 | 011 |
| 1 | 1 | 1 | 0 | 0 | 100 | 111 (Fault) |
| 1 | 1 | 1 | 0 | 1 | 100 | 111 (Fault) |
| 1 | 1 | 1 | 1 | 0 | 100 | 111 (Fault) |
| 1 | 1 | 1 | 1 | 1 | 100 | 111 (Fault) |

TABLE V(e)(1)

| Current Conditions | Next State |
|---|---|
| 10010100 | :NXT_STATE <= 001; (Primary) |
| ?0000100 | :NXT_STATE <= 010; (Secondary) |
| 0101?100 or 11011100 | :NXT_STATE <= 011; (Pseudo-Fault-Primary |
| ?1000100 or 11010100 | :NXT_STATE <= 100; (Pseudo-Fault-Secondary |
| | :NXT_STATE <= 101; (Pseudo-Primary) |
| ?0100100 or 10110100 | :NXT_STATE <= 110; (Pseudo-Secondary) |
| ?11????? or 0001?100 or 00001100 or 0011?100 or 00101100 or 01001100 or 100?1100 or 101?1100 or 11001100 | :NXT_STATE <= 111; (Fault) |

TABLEs V(f) show Card Status Next State tables where the current state is Pseudo-Primary.

TABLE V(f)(1)

| BCC Position | Front End Connection | External Primary Signal | Peer BCC | Current Card State | Next Card State |
|---|---|---|---|---|---|
| 0 | 0 | 0 | 0 | 0 | 101 | 111 |
| 0 | 0 | 0 | 0 | 1 | 101 | 111 |
| 0 | 0 | 0 | 1 | 0 | 101 | 001 |
| 0 | 0 | 0 | 1 | 1 | 101 | 001 |
| 0 | 0 | 1 | 0 | 0 | 101 | 110 |
| 0 | 0 | 1 | 0 | 1 | 101 | 111 |
| 0 | 0 | 1 | 1 | 0 | 101 | 101 |
| 0 | 0 | 1 | 1 | 1 | 101 | 101 |
| 0 | 1 | 0 | 0 | 0 | 101 | 111 |
| 0 | 1 | 0 | 0 | 1 | 101 | 111 |
| 0 | 1 | 0 | 1 | 0 | 101 | 011 |
| 0 | 1 | 0 | 1 | 1 | 101 | 011 |
| 0 | 1 | 1 | 0 | 0 | 101 | 111 (Fault) |
| 0 | 1 | 1 | 0 | 1 | 101 | 111 (Fault) |
| 0 | 1 | 1 | 1 | 0 | 101 | 111 (Fault) |
| 0 | 1 | 1 | 1 | 1 | 101 | 111 (Fault) |
| 1 | 0 | 0 | 0 | 0 | 101 | 111 |

TABLE V(f)(1)-continued

| BCC Position | Front End Connection | External Primary Signal | Peer BCC | Current Card State | Next Card State |
|---|---|---|---|---|---|
| 1 | 0 | 0 | 0 | 101 | 111 |
| 1 | 0 | 0 | 1 | 101 | 111 |
| 1 | 0 | 0 | 1 | 101 | 001 |
| 1 | 0 | 1 | 0 | 101 | 110 |
| 1 | 0 | 1 | 0 | 101 | 111 |
| 1 | 0 | 1 | 1 | 101 | 110 |
| 1 | 0 | 1 | 1 | 101 | 101 |
| 1 | 1 | 0 | 0 | 101 | 111 |
| 1 | 1 | 0 | 0 | 101 | 111 |
| 1 | 1 | 0 | 1 | 101 | 111 |
| 1 | 1 | 0 | 1 | 101 | 011 |
| 1 | 1 | 1 | 0 | 101 | 111 (Fault) |
| 1 | 1 | 1 | 0 | 101 | 111 (Fault) |
| 1 | 1 | 1 | 1 | 101 | 111 (Fault) |
| 1 | 1 | 1 | 1 | 101 | 111 (Fault) |

TABLE V(f)(1)

| Current Conditions | Next State |
|---|---|
| 0000?101 or 10010101 | :NXT_STATE <= 001; (Primary) |
|  | :NXT_STATE <= 010; (Secondary) |
| 0101?101 or 11011101 | :NXT_STATE <= 011; (Pseudo-Fault-Primary) |
|  | :NXT_STATE <= 100; (Pseudo-Fault-Secondary) |
| 0011?101 or 10111101 | :NXT_STATE <= 101; (Pseudo-Primary) |
| ?0100101 or 10110101 | :NXT_STATE <= 110; (Pseudo-Secondary) |
| ?11????? or ?00?0101 or ?100?101 or 00101101 or 10101101 or 11010101 | :NXT_STATE <= 111; (Fault) |

TABLEs V(g) show Card Status Next State tables where the current state is Pseudo-Secondary.

TABLE V(g)(1)

| BCC Position | Front End Connection | External Primary Signal | Peer BCC | Current Card State | Next Card State |
|---|---|---|---|---|---|
| 0 | 0 | 0 | 0 | 110 | 010 |
| 0 | 0 | 0 | 1 | 110 | 111 |
| 0 | 0 | 0 | 1 | 110 | 111 |
| 0 | 0 | 0 | 1 | 110 | 111 |
| 0 | 0 | 1 | 0 | 110 | 110 |
| 0 | 0 | 1 | 1 | 110 | 111 |
| 0 | 0 | 1 | 1 | 110 | 101 |
| 0 | 0 | 1 | 1 | 110 | 101 |
| 0 | 1 | 0 | 0 | 110 | 100 |
| 0 | 1 | 0 | 1 | 110 | 111 |
| 0 | 1 | 0 | 0 | 110 | 111 |
| 0 | 1 | 0 | 1 | 110 | 111 |
| 0 | 1 | 1 | 0 | 110 | 111 (Fault) |
| 0 | 1 | 1 | 0 | 110 | 111 (Fault) |
| 0 | 1 | 1 | 1 | 110 | 111 (Fault) |
| 1 | 0 | 0 | 0 | 110 | 010 |
| 1 | 0 | 0 | 1 | 110 | 111 |
| 1 | 0 | 0 | 0 | 110 | 001 |
| 1 | 0 | 0 | 1 | 110 | 111 |
| 1 | 0 | 1 | 0 | 110 | 110 |
| 1 | 0 | 1 | 0 | 110 | 111 |
| 1 | 0 | 1 | 1 | 110 | 110 |
| 1 | 0 | 1 | 1 | 110 | 101 |
| 1 | 1 | 0 | 0 | 110 | 100 |
| 1 | 1 | 0 | 1 | 110 | 111 |

TABLE V(g)(1)-continued

| BCC Position | Front End Connection | External Primary Signal | Peer BCC | Current Card State | Next Card State |
|---|---|---|---|---|---|
| 1 | 1 | 0 | 1 | 0 | 110 | 100 |
| 1 | 1 | 0 | 1 | 1 | 110 | 111 |
| 1 | 1 | 1 | 0 | 0 | 110 | 111 (Fault) |
| 1 | 1 | 1 | 0 | 1 | 110 | 111 (Fault) |
| 1 | 1 | 1 | 1 | 0 | 110 | 111 (Fault) |
| 1 | 1 | 1 | 1 | 1 | 110 | 111 (Fault) |

TABLE V(g)(1)

| Current Conditions | Next State |
|---|---|
| 10010110 | :NXT_STATE <= 001; (Primary) |
| ?0000110 | :NXT_STATE <= 010; (Secondary) |
|  | :NXT_STATE <= 011; (Pseudo-Fault-Primary) |
| ?1000110 or 11010110 | :NXT_STATE <= 100; (Pseudo-Fault-Secondary) |
| 0011?110 or 10111110 | :NXT_STATE <= 101; (Pseudo-Primary) |
| ?0100110 or 10110110 | :NXT_STATE <= 110; (Pseudo-Secondary) |
| ?11????? or 0?01?110 or 0?001110 or ?0101110 or 100?1110 or 110?1110 | :NXT_STATE <= 111; (Fault) |

TABLEs V(h) show Card Status Next State tables where the current state is Fault.

TABLE V(h)(1)

| BCC Position | Front End Connection | External Primary Signal | Peer BCC | Current Card State | Next Card State |
|---|---|---|---|---|---|
| 0 | 0 | 0 | 0 | 111 | 010 |
| 0 | 0 | 0 | 1 | 111 | 001 |
| 0 | 0 | 0 | 1 | 0 | 111 | 001 |
| 0 | 0 | 0 | 1 | 1 | 111 | 001 |
| 0 | 0 | 1 | 0 | 0 | 111 | 110 |
| 0 | 0 | 1 | 0 | 1 | 111 | 111 |
| 0 | 0 | 1 | 1 | 0 | 111 | 101 |
| 0 | 0 | 1 | 1 | 1 | 111 | 101 |
| 0 | 1 | 0 | 0 | 0 | 111 | 100 |
| 0 | 1 | 0 | 0 | 1 | 111 | 111 |
| 0 | 1 | 0 | 1 | 0 | 111 | 011 |
| 0 | 1 | 0 | 1 | 1 | 111 | 011 |
| 0 | 1 | 1 | 0 | 0 | 111 | 111 (Fault) |
| 0 | 1 | 1 | 0 | 1 | 111 | 111 (Fault) |
| 0 | 1 | 1 | 1 | 0 | 111 | 111 (Fault) |
| 0 | 1 | 1 | 1 | 1 | 111 | 111 (Fault) |
| 1 | 0 | 0 | 0 | 0 | 111 | 010 |
| 1 | 0 | 0 | 0 | 1 | 111 | 001 |
| 1 | 0 | 0 | 1 | 0 | 111 | 001 |
| 1 | 0 | 0 | 1 | 1 | 111 | 001 |
| 1 | 0 | 1 | 0 | 0 | 111 | 110 |
| 1 | 0 | 1 | 0 | 1 | 111 | 111 |
| 1 | 0 | 1 | 1 | 0 | 111 | 110 |
| 1 | 0 | 1 | 1 | 1 | 111 | 101 |
| 1 | 1 | 0 | 0 | 0 | 111 | 100 |
| 1 | 1 | 0 | 0 | 1 | 111 | 111 |
| 1 | 1 | 0 | 1 | 0 | 111 | 100 |
| 1 | 1 | 0 | 1 | 1 | 111 | 011 |
| 1 | 1 | 1 | 0 | 0 | 111 | 111 (Fault) |
| 1 | 1 | 1 | 0 | 1 | 111 | 111 (Fault) |
| 1 | 1 | 1 | 1 | 0 | 111 | 111 (Fault) |
| 1 | 1 | 1 | 1 | 1 | 111 | 111 (Fault) |

TABLE V(h)(1)

| Current Conditions | Next State |
|---|---|
| ?001?111 or ?0001111 | :NXT_STATE <= 001; (Primary) |
| ?0000111 | :NXT_STATE <= 010; (Secondary) |
| 0101?111 or 11011111 | :NXT_STATE <= 011; (Pseudo-Fault-Primary |
| ?1000111 or 11010111 | :NXT_STATE <= 100; (Pseudo-Fault-Secondary |
| 0011?111 or 10111111 | :NXT_STATE <= 101; (Pseudo-Primary) |
| ?0100111 or 10110111 | :NXT_STATE <= 110; (Pseudo-Secondary) |
| ?11????? or ?0101111 or ?1001111 | :NXT_STATE <= 111; (Fault) |

Pseudo-code depicts an example of an interface status determining embodiment that handles fault and reset exceptions and gives a case statement that implements a state machine for a technique based on TABLEs V. The method can be executed when one of the #SLOT_A, FRONT_CON_1, FRONT_CON_0, #PRI_BCC, #PEER_DET, #BCC_FLT_IN, or #BCC_FLT_OUT signals change.

```
If (_reset==0) then state <=000; /* If BCC is reset, state is
PowerUp (000) */
Else if (#BCC_FLT_IN==0) then state <=111; /* If BCC fault
go to Fault mode*/
Else if (#BCC_FLT_IN==0) then
    Case {Front_Conn_1, Front_Conn_0}
    2'b 00 : state <=001; /* If connection goto Primary state*/
    2'b 01 : state <=101; /* If NOT connection goto
    Pseudo-Primary state*/
    2'b 10 : state <=011; /* If Improper connection goto Pseudo-Fault-
                            Primary state*/
    2'b 11 : state <=111; /* If fault goto Fault state*/
    end case
Else
    Case({#Slot_A, Front_Conn_1, Front_Conn_0, #PRI_BCC,
                       #PEER_DET, state})
    /* Cases for going to Primary State */
    8'b ?001?000 : state <=001;
    8'b ?00??001 : state <=001;
    8'b ?001?010 : state <=001;
    8'b ?0001010 : state <=001;
    8'b ?0001?011 : state <=001;
    8'b 10011011 : state <=001;
    8'b 10010100 : state <=001;
    8'b 0000?101 : state <=001;
    8'b 10010101 : state <=001;
    8'b 10010110 : state <=001;
    8'b ?001?111 : state <=001;
    8'b ?0001111 : state <=001;
    /* Cases for going to Secondary State */
    8'b ?0000000 : state <=010;
    8'b ?0000010 : state <=010;
    8'b ?0000100 : state <=010;
    8'b ?0000110 : state <=010;
    8'b ?0000111 : state <=010;
    /* Cases for going to Pseudo-Fault-Primary State */
    8'b 0101?000 : state <=011;
    8'b 11011000 : state <=011;
    8'b ?10??001 : state <=011;
    8'b 0101?011 : state <=011;
    8'b 11011011 : state <=011;
    8'b 0101?100 : state <=011;
    8'b 11011100 : state <=011;
    8'b 0101?101 : state <=011;
    8'b 11011101 : state <=011;
    8'b 0101?111 : state <=011;
    8'b 11011111 : state <=011;
    /* Cases for going to Pseudo-Fault-Secondary State */
    8'b 110?0000 : state <=100;
    8'b 01000000 : state <=100;
    8'b ?1000010 : state <=100;
    8'b 01000011 : state <=100;
    8'b 11010011 : state <=100;
    8'b ?1000100 : state <=100;
    8'b 11010110 : state <=100;
    8'b ?1000110 : state <=100;
    8'b 11010110 : state <=100;
    8'b ?1000111 : state <=100;
    8'b 11010111 : state <=100;
    /* Cases for going to Pseudo-Primary State */
    8'b 0011?000 : state <=101;
    8'b 10111000 : state <=101;
    8'b ?01??001 : state <=101;
    8'b 0011?011 : state <=101;
    8'b 10111011 : state <=101;
    8'b 0011?101 : state <=101;
    8'b 10111101 : state <=101;
    8'b 0011?110 : state <=101;
    8'b 10111110 : state <=101;
    8'b 0011?111 : state <=101;
    8'b 10111111 : state <=101;
    /* Cases for going to Pseudo-Secondary State */
    8'b 10110000 : state <=110;
    8'b ?0100000 : state <=110;
    8'b ?0100010 : state <=110;
    8'b ?0100100 : state <=110;
    8'b 10110100 : state <=110;
    8'b ?0100101 : state <=110;
    8'b 10110101 : state <=110;
    8'b ?0100110 : state <=110;
    8'b 10110110 : state <=110;
    8'b ?0100111 : state <=110;
    8'b 10110111 : state <=110;
    /* Cases for going to Fault State */
    8'b ?11????? : state <=111;
    8'b ???01000 : state <=111;
    8'b ?011?010 : state <=111;
    8'b ?0101010 : state <=111;
    8'b ?101?010 : state <=111;
    8'b ?1001010 : state <=111;
    8'b ?0?0?011 : state <=111;
    8'b 01001011 : state <=111;
    8'b 10?10011 : state <=111;
    8'b 0001?100 : state <=111;
    8'b 00001100 : state <=111;
    8'b 0011?100 : state <=111;
    8'b 00101100 : state <=111;
    8'b 01001100 : state <=111;
    8'b 100?1100 : state <=111;
    8'b 101?1100 : state <=111;
    8'b 11001100 : state <=111;
    8'b ?00?0101 : state <=111;
    8'b ?100?101 : state <=111;
    8'b 00101101 : state <=111;
    8'b 10010101 : state <=111;
    8'b 10101101 : state <=111;
    8'b 11010101 : state <=111;
    8'b 0?01?110 : state <=111;
    8'b 0?001110 : state <=111;
    8'b ?0101110 : state <=111;
    8'b 100?1110 : state <=111;
    8'b 110?1110 : state <=111;
    8'b ?0101111 : state <=111;
    8'b ?1001111 : state <=111;
    end case
```

Figure 9:
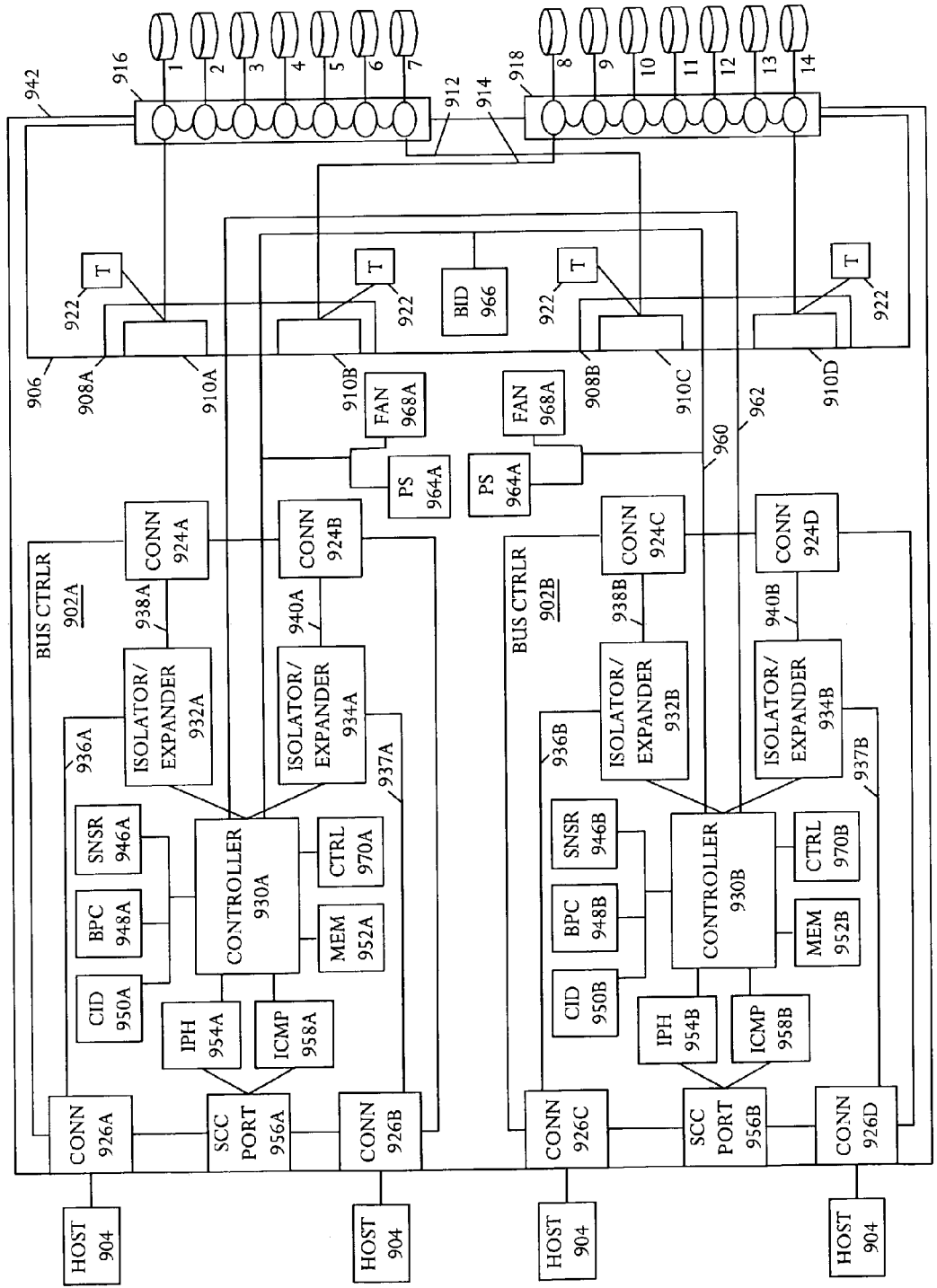
FIG. 9 is a schematic block diagram showing an example of a communication system with a data path architecture between one or more bus controller cards, peripheral devices, and host computers including, respectively, a system view, component interconnections, and monitor elements.

FIG. 9 is a block diagram showing a data communication system 900 for high speed data transfer between peripheral devices 1 through 14 and host computers 904 via BCCs 902A and 902B. Bus controller cards (BCCs) 902A and 902B are configured to transfer data at very high speeds, such as 160, 320, or more, megabytes per second. One BCC 902A or 902B can assume data transfer responsibilities of the other BCC when the other BCC is removed or is disabled by a fault/error condition. BCCs 902A and 902B include monitoring circuitry to detect events such as removal or insertion of the other BCC, and monitor operating status of the other BCC. When a BCC is inserted but has a fault condition, the other BCC can reset the faulted BCC. Under various situations BCCs 902A, 902B can include one or more other logic components that hold the reset signal and prevent lost or corrupted data transfers until system components are configured and ready for operation.

BCCs 902A and 902B interface with backplane 906, typically a printed circuit board (PCB) that is installed within other assemblies such as a chassis for housing peripheral devices 1 through 14, as well as BCCs 902A, 902B. In some embodiments, backplane 906 includes interface slots 908A, 908B with connector portions 910A, 910B, and 910C, 910D, respectively, that electrically connect BCCs 902A and 902B to backplane 906.

Interface slots 908A and 908B, also called bus controller slots 908A and 908B, are electrically connected and configured to interact and communicate with components included on BCCs 902A, 902B and backplane components. Generally, when multiple peripheral devices and controller cards are included in a system, various actions or events can affect system configuration. Controllers 930A and 930B can include logic that configures status of BCCs 902A and 902B depending on the type of action or event. The actions or events can include: attaching or removing one or more peripheral devices from system 900; attaching or removing one or more controller cards from system 900; removing or attaching a cable to backplane 906; and powering system 900.

BCCs 902A and 902B can be fabricated as single or multi-layered printed circuit board(s), with layers designed to accommodate specified impedance for connections to host computers 904 and backplane 906. In some embodiments, BCCs 902A and 902B handle only differential signals, such as LVD signals, eliminating support for single ended (SE) signals and simplifying impedance matching considerations. Some embodiments allow data path signal traces on either internal layers or the external layers of the PCB, but not both, to avoid speed differences in the data signals. Data signal trace width on the BCC PCBs can be varied to match impedance at host connector portions 926A through 926D, and at backplane connector portions 924A through 924D.

Buses A 912 and B 914 on backplane 906 enable data communication between peripheral devices 1 through 14 and host computing systems 904, functionally coupled to backplane 906 via BCCs 902A, 902B. BCCs 902A and 902B, as well as A and B buses 912 and 914, can communicate using the SCSI communication or other protocol. In some embodiments, buses 912 and 914 are low voltage differential (LVD) Ultra-4 or Ultra-320 SCSI buses, for example. Alternatively, system 900 may include other types of communication interfaces and operate in accordance with other communication protocols.

A bus 912 and B bus 914 include a plurality of ports 916 and 918 respectively. Ports 916 and 918 can each have the same physical configuration. Peripheral devices 1 through 14 such as disk drives or other devices are adapted to communicate with ports 916, 918. Arrangement, type, and number of ports 916, 918 between buses 912, 914 may be configured in other arrangements and are not limited to the embodiment illustrated in FIG. 9.

In some embodiments, connector portions 910A and 910C are electrically connected to A bus 912, and connector portions 910B and 910D are electrically connected to B bus 914. Connector portions 910A and 910B are physically and electrically configured to receive a first bus controller card, such as BCC 902A. Connector portions 910C and 910D are physically and electrically configured to receive a second bus controller card such as BCC 902B.

BCCs 902A and 902B respectively include transceivers that can convert voltage levels of differential signals to the voltage level of signals utilized on a single-ended bus, or can only recondition and resend the same signal levels. Terminators 922 can be connected to backplane connectors 910A through 910D to signal the terminal end of buses 912, 914. To work properly, terminators 922 use "term power" from bus 912 or 914. Term power is typically supplied by the host adapter and by the other devices on bus 912 and/or 914 or, in this case, power is supplied by a local power supply. In one embodiment, terminators 922 can be model number DS2108 terminators from Dallas Semiconductor.

In one or more embodiments, BCCs 902A, 902B include connector portions 924A through 924D, which are physically and electrically adapted to mate with backplane connector portions 910A through 910D. Backplane connector portions 910A through 910D and connector portions 924A through 924D are most appropriately impedance controlled connectors designed for high-speed digital signals. In one embodiment, connector portions 924A through 924D are 120 pin count Methode/Teradyne connectors.

In some embodiments, one of BCC 902A or 902B assumes primary status and acts as a central control logic unit for managing configuration of system components. With two or more BCCs, system 900 can be implemented to give primary status to a BCC in a predesignated slot. The primary and non-primary BCCs are substantially physically and electrically the same, with "primary" and "non-primary" denoting functions of the bus controller cards rather than unique physical configurations. Other schemes for designating primary and non-primary BCCs can be utilized.

In some embodiments, the primary BCC is responsible for configuring buses 912, 914, as well as performing other services such as bus addressing. The non-primary BCC is not responsible for configuring buses 912, 914, and responds to bus operation commands from the primary card rather than initiating commands independently. In other embodiments, both primary and non-primary BCCs can configure buses 912, 914, initiate, and respond to bus operation commands.

BCCs 902A and 902B can be hot-swapped, the ability to remove and replace BCC 902A and/or 902B without interrupting communication system operations. The interface architecture of communication system 900 allows BCC 902A to monitor the status of BCC 902B, and vice versa. In some circumstances, such as hot-swapping, BCCs 902A and/or 902B perform fail-over activities for robust system performance. For example, when BCC 902A or 902B is removed or replaced, is not fully connected, or experiences a fault condition, the other BCC performs functions such as determining whether to change primary or non-primary status, setting signals to activate fault indications, and resetting BCC 902A or 902B. For systems with more than two BCCs, the number and interconnections between buses on backplane 906 can vary accordingly.

Host connector portions 926A, 926B are electrically connected to BCC 902A. Similarly, host connector portions 926C, 926D are electrically connected to BCC 902B. Host connector portions 926A through 926D are adapted, respectively, for connection to a host device, such as a host computers 904. Host connector portions 926A through 926D receive voltage-differential input signals and transmit voltage-differential output signals. BCCs 902A and 902B can form an independent channel of communication between each host computer 904 and communication buses 912, 914 implemented on backplane 906. In some embodiments, host connector portions 926A through 926D are implemented with connector portions that conform to the Very High Density Cable Interconnect (VHDCI) connector standard. Other suitable connectors and connector standards can be used.

Card controllers 930A, 930B can be implemented with any suitable processing device, such as controller model number VSC205 from Vitesse Semiconductor Corporation in Camarillo, Calif. in combination with FPGA/PLDs that are used to monitor and react to time sensitive signals. Card controllers 930A, 930B execute instructions to control BCC 902A, 902B; communicate status information and data to host computers 904 via a data bus, such as a SCSI bus; and can also support diagnostic procedures for various components of system 900.

BCCs 902A and 902B can include isolators/expanders 932A, 934A, and 932B, 934B, respectively, to isolate and retime data signals. Isolators/expanders 932A, 934A can isolate A and B buses 912 and 914 from monitor circuitry on BCC 902A, while isolators/expanders 932B, 934B can isolate A and B buses 912 and 914 from monitor, circuitry on BCC 902B. Expander 932A communicates with backplane connector 924A, host connector portion 926A, and card controller 930A, while expander 934A communicates with backplane connector 924B, host connector portion 926B and card controller 930A. On BCC 902B, expander 932B communicates with backplane connector 924C, host connector portion 926B, and controller 930B, while expander 934B communicates with backplane connector 924D, host connector portion 926D and controller 930B.

Expanders 932A, 934A, 932B, and 934B support installation, removal, or exchange of peripherals while the system remains in operation. A controller or monitor that performs an isolation function monitors and protects host computers 904 and other devices by delaying the actual power up/down of the peripherals until an inactive time period is detected between bus cycles, preventing interruption of other bus activity. The isolation function also prevents power sequencing from generating signal noise that can corrupt data signals. In some embodiments, expanders 932A, 934A, and 932B, 934B are implemented in an integrated circuit from LSI Logic Corporation in Milpitas, Calif., such as part numbers SYM53C180 or SYM53C320, depending on the data transfer speed. Other suitable devices can be utilized. Expanders 932A, 934A, and 932B, 934B can be placed as close to backplane connector portions 924A through 924D as possible to minimize the length of data bus signal traces 938A, 940A, 938B, and 940B.

Impedance for the front end data path from host connector portions 926A and 926B to card controller 930A is designed to match a cable interface having a measurable coupled differential impedance, for example, of 135 ohms. Impedance for a back end data path from expanders 932A and 934A to backplane connector portions 924A and 924B typically differs from the front end data path impedance, and may only match a single-ended impedance, for example 67 ohms, for a decoupled differential impedance of 134 ohms.

In the illustrative embodiment, buses 912 and 914 are each divided into three segments on BCCs 902A and 902B, respectively. A first bus segment 936A is routed from host connector portion 926A to expander 932A to card controller 930A, to expander 934A, and then to host connector portion 926B. A second bus segment 938A originates from expander 932A to backplane connector portion 924A, and a third bus segment 940A originates from expander 934A to backplane connector portion 924B. BCC 902A can connect to buses 912, 914 on backplane 906 if both isolators/expanders 932A and 934A are activated, or connect to one bus on backplane 906 if only one expander 932A or 934A is activated. A similar data bus structure can be implemented on other BCCs, such as BCC 902B, shown with bus segments 936B, 938B, and 940B corresponding to bus segments 936A, 938A, and 940A on BCC 902A. BCCs 902A and 902B respectively can include transceivers to convert differential signal voltage levels to the voltage level of signals on buses 936A and 936B.

System 900 can operate in full bus or split bus mode. In full bus mode, all peripherals 1–14 can be accessed by the primary BCC and the Secondary BCC, if available. The non-primary BCC assumes Primary functionality in the event of Primary failure. In split bus mode, one BCC accesses data through A bus 912 while the other BCC accesses peripherals 1–14 through B bus 914. In some embodiments, a high and low address bank for each separate bus 916, 918 on backplane 906 can be utilized. In other embodiments, each slot 908A, 908B on backplane 906 is assigned an address to eliminate the need to route address control signals across backplane 906. In split bus mode, monitor circuitry utilizes an address on backplane 906 that is not utilized by any of peripherals 1 through 14. For example, SCSI bus typically allows addressing up to 15 peripheral devices. One of the 15 addresses can be reserved for use by the monitor circuitry on BCCs 902A, 902B to communicate operational and status parameters to Hosts 904. BCCs 902A and 902B communicate with each other over out of band serial buses such as general purpose serial I/O bus For BCCs 902A and 902B connected to backplane 906, system 900 operates in full bus mode with the separate buses 912, 914 interconnected on backplane 906. The non-primary BCC does not receive commands directly from bus 912 or 914 since primary BCC sends bus commands to the non-primary BCC. Other addressing and command schemes may be suitable. Various configurations of host computers 904 and BCCs 902A, 902B can be included in system 900, such as:

two host computers 904 connected to a single BCC in full bus mode;

two BCCs in full or split bus mode and two host computers 904, with one of host computer 904 connected to one BCC, and the other host computer 904 connected to the other BCC; and two BCCs in full or split bus mode and four host computers 904, as shown in FIG. 9.

In some examples, backplane 906 may be included in a Hewlett-Packard DS2300 disk enclosure and may be adapted to receive DS2300 bus controller cards. DS2300 controller cards use a low voltage differential (LVD) interface to buses 912 and 914.

System 900 has components for monitoring enclosure 942 and operating BCCs 902A and 902B. The system 900 includes card controllers 930A, 930B; sensors modules 946A, 946B; backplane controllers (BPCs) 948A, 948B; card identifier modules 950A, 950B; and backplane identifier module 966. The system 900 also includes flash memory 952A, 952B; serial communication connector port 956A, 956B, such as an RJ12 connector port; and interface protocol handlers such as RS-232 serial communication protocol handler 954A, 954B, and Internet Control Message Protocol handler 958A, 958B. The system monitors status and configuration of enclosure 942 and BCCs 902A, 902B; gives status information to card controllers 930A, 930B and to host computers 904; and controls configuration and status indicators. In some embodiments, monitor circuitry components on BCCs 902A, 902B communicate with card controllers 930A, 930B via a relatively low-speed system bus, such as an Inter-IC bus (I2C). Other data communication infrastructures and protocols may be suitable.

Status information can be formatted using standardized data structures, such as SCSI Enclosure Services (SES) and SCSI Accessed Fault Tolerant Enclosure (SAF-TE) data structures. Messaging from enclosures that are compliant with SES and SAF-TE standards can be translated to audible and visible notifications on enclosure 942, such as status lights and alarms, to indicate failure of critical components. Enclosure 942 can have one or more switches, allowing an administrator to enable the SES, SAF-TE, or other monitor interface scheme.

Sensor modules 946A, 946B can monitor voltage, fan speed, temperature, and other parameters at BCCs 902A and 902B. One suitable set of sensor modules 946A, 946B is model number LM80, which is commercially available from National Semiconductor Corporation in Santa Clara, Calif. In some embodiments, Intelligent Platform Management Interface (IPMI) specification defines a standard interface protocol for sensor modules 946A and 946B. Other sensors specifications may be suitable.

Backplane controllers 948A, 948B interface with card controllers 930A, 930B, respectively, to give control information and report on system configuration. In some embodiments, backplane controllers 948A, 948B are implemented with backplane controller model number VSC055 from Vitesse Semiconductor Corporation in Camarillo, Calif. Other components for performing backplane controller functions may be suitable. Signals accessed by backplane controllers 948A, 948B can include disk drive detection, BCC primary or non-primary status, expander enable and disable, disk drive fault indicators, audible and visual enclosure or chassis indicators, and bus controller card fault detection. Other signals include bus reset control enable, power supply fan status, and others.

Card identifier modules 950A, 950B supply information, such as serial and product numbers of BCCs 902A and 902B to card controllers 930A, 930B. Backplane identifier module 966 also supplies backplane information such as serial and product number to card controllers 930A, 930B. In some embodiments, identifier modules 950A, 950B, and 966 are implemented with an electronically erasable programmable read only memory (EEPROM) and conform to Field Replaceable Unit Identifier (FRU-ID) standard. Field replaceable units (FRU) can be hot swappable and individually replaced by a field engineer. A FRU-Id code can be included in an error message or diagnostic output indicating the physical location of a system component such as a power supply or I/O port. Other identifier modules may be suitable.

RJ-12 connector 956A enables connection to a diagnostic port in card controller 930A, 930B to access troubleshooting information, download software and firmware instructions, and as an ICMP interface for test functions.

Monitor data buses 960 and 962 transmit data between card controllers 930A and 930B across backplane 906. Data exchanged between controllers 930A and 930B can include a periodic heartbeat signal from each controller 930A, 930B to the other to indicate the other is operational, a reset signal allowing reset of a faulted BCC by another BCC, and other data. If the heartbeat signal is lost in the primary BCC, the non-primary BCC assumes primary BCC functions. Operational status of power supply 964A and a cooling fan can also be transmitted periodically to controller 930A via bus 960. Similarly, bus 960 can transmit operational status of power supply 964B and the cooling fan to controller 930B. Card controllers 930A and 930B can share data that warns of monitoring degradation and potential failure of a component. Warnings and alerts can be issued by any suitable method such as indicator lights on enclosure 942, audible tones, and messages displayed on a system administrator's console. In some embodiments, buses 960 and 962 can be implemented with a relatively low-speed system bus, such as an Inter-IC bus (I2C). Other suitable data communication infrastructures and protocols can be utilized in addition to, or instead of, the I2C standard.

Panel switches and internal switches may be also included on enclosure 942 for BCCs 902A and 902B. The switches can be set in various configurations, such as split bus or full bus mode, to enable desired system functionality.

One or more logic units can be included on BCCs 902A and 902B, such as FPGA 954A, to perform time critical tasks. For example, FPGA 954A can generate reset signals and control enclosure indicators to inform of alert conditions and trigger processes to help prevent data loss or corruption. Conditions may include insertion or removal of a BCC in system 900; insertion or removal of a peripheral; imminent loss of power from power supply 964A or 964B; loss of term power; and cable removal from one of host connector portions 926A through 926D.

Instructions in FPGAs 954A, 954B can be updated by corresponding card controller 930A, 930B or other suitable devices. Card controllers 930A, 930B and FPGAs 954A, 954B can cross-monitor operating status and assert a fault indication on detection of non-operational status. In some embodiments, FPGAs 954A, 954B include instructions to perform one or more of functions including bus resets, miscellaneous status and control, and driving indicators. Bus resets may include reset on time critical conditions such as peripheral insertion and removal, second BCC insertion and removal, imminent loss of power, loss of termination power, and cable or terminator removal from a connector. Miscellaneous status and control includes time critical events such as expander reset generation and an indication of BCC full insertion. Non-time critical status and control includes driving the disks delayed start signal and monitoring BCC system clock and indicating clock failure with a board fault. Driving indicators include a peripheral fault indicator, a bus configuration (full or split bus) indicator, a term power available indicator, an SES indicator for monitoring the enclosure, SAF-TE indicator for enclosure monitoring, an enclosure power indicator, and an enclosure fault or FRU failure indicator.

A clock signal can be supplied by one or more of host computers 904 or generated by an oscillator implemented on BCCs 902A and 902B. The clock signal can be supplied to any component on BCCs 902A and 902B.

The illustrative BCCs 902A and 902B enhance BCC functionality by enabling high speed signal communication across separate buses 912, 914 on backplane 906. Alternatively, high speed signals from host connector portions 926A and 926B, or 926C and 926D, can be communicated across only one of buses 912, 914.

High speed data signal integrity can be optimized in illustrative BCC embodiments by matching impedance and length of the traces for data bus segments 936A, 938A, and 940A across one or more PCB routing layers. Trace width can be varied to match impedance and trace length varied to match electrical lengths, improving data transfer speed. Signal trace stubs to components on BCC 902A can be reduced or eliminated by connecting signal traces directly to components rather than by tee connections. Length of bus segments 938A and 940A can be reduced by positioning expanders 932A and 934A as close to backplane connector portions 924A and 924B as possible.

In some embodiments, two expanders 932A, 934A on the same BCC 902A can be enabled simultaneously, forming a controllable bridge connection between A bus 912 and B bus 914, eliminating the need for a dedicated bridge module.

Described logic modules and circuitry may be implemented using any suitable combination of hardware, software, and/or firmware, such as Field Programmable Gate Arrays (FPGAs), Application Specific Integrated Circuit (ASICs), or other suitable devices. A FPGA is a programmable logic device (PLD) with a high density of gates. An ASIC is a microprocessor that is custom designed for a specific application rather than a general-purpose microprocessor. Use of FPGAs and ASICs improves system performance in comparison to general-purpose CPUs, because logic chips are hardwired to perform a specific task and avoid the overhead of fetching and interpreting stored instructions. Logic modules can be independently implemented or included in one of the other system components such as controllers 930A and 930B. Other BCC components described as separate and discrete components may be combined to form larger or different integrated circuits or electrical assemblies, if desired. Although the illustrative example describes a particular type of bus interface, specifically a High Speed Dual Ported SCSI Bus Interface, the claimed elements and actions may be utilized in other bus interface applications defined under other standards. Furthermore, the particular control and monitoring devices and components may be replaced by other elements that are capable of performing the illustrative functions. For example, alternative types of controllers may include processors, digital signal processors, state machines, field programmable gate arrays, programmable logic devices, discrete circuitry, and the like. Program elements may be supplied by various software, firmware, and hardware implementations, supplied by various suitable media including physical and virtual media, such as magnetic media, transmitted signals, and the like.

What is claimed is:

1. A bus controller configured to control a dual-ported bus interface comprising:
   a state machine adapted to execute in the dual ported bus interface, the dual ported bus interface having first and second front end ports for connection to hosts and being adapted for insertion into one of first and second slots for connection to one or more buses on a backplane,
   the state machine determining bus interface state based on information from the peer interface received across the backplane; and status of the first and second front end ports, wherein bus interface states comprise:
      a primary state entered for a condition of no faults, a correctly-connected bus interface, and the peer interface not presently in the primary state; and
      a secondary state entered for a condition of no faults, the correctly-connected bus interface, and the peer interface presently in the primary state.

2. A bus controller capable of controlling a dual ported bus interface in combination with a peer interface, the bus controller comprising:
   a state machine capable of executing in the dual ported bus interface, the dual ported bus interface having first and second front end ports for connection to hosts, and being capable of insertion into one of first and second slots for connection to one or more buses on a backplane,
   the state machine determining bus interface state based on information from the peer interface received across the backplane, and status of the first and second front end ports, wherein:
   the dual ported bus interface further comprises first and second isolator/expanders respectively coupled to the first and second front end ports; and
   the state machine operates in a plurality of states comprising:
      a primary state that is entered for a condition of no faults, the bus interface is correctly connected, and the peer interface is not presently in the primary state;
      one or more pseudo-primary states that are entered for a condition of one or more front end ports not connected or term power is lacking for one or more of the front end ports, and the peer interface cannot assume the primary state;
      a secondary state that is entered for a condition of no faults, the bus interface is correctly connected, and the peer interface has assumed the primary state; and
      one or more pseudo-secondary states that are entered for a condition of one or more front end ports not connected, term power is lacking for one or more of the front end ports, and the peer interface is connected to the first slot and not faulted.

3. The bus controller according to claim 2 wherein the one or more pseudo-primary states further comprise:
   a first pseudo-primary state that is entered for a condition that the first and second front end ports are not connected or the first and second front end ports are connected properly with no term power, and the peer interface cannot assume primary state; and
   a pseudo-fault primary state that is entered for a condition that only one front end port is not connected or a low voltage differential (LVD) connection is not made, and the peer interface cannot assume the primary state.

4. The bus controller according to claim 2 wherein:
   the dual ported bus interface further comprises a configuration switch, the peer interface having a corresponding configuration switch; and
   the secondary state is entered for a condition of no faults, the bus interface is correctly connected, the bus interface configuration switch matches the peer interface configuration switch, and the peer interface has assumed the primary state.

5. The bus controller according to claim 2 wherein:
   the dual ported bus interface further comprises a configuration switch, the peer interface having a corresponding configuration switch; and
   the one or more pseudo-secondary states further comprise:
      a first pseudo-secondary state that is entered for a condition that the first and second front end ports are not connected or the first and second front end ports are connected properly with no term power, and the peer interface is connected to the first slot and not faulted; and
      a pseudo-fault secondary state that is entered for a condition that only one front end port is not connected or a low voltage differential (LVD) connection is not made or the bus interface and peer interface configuration switches mismatch, and the peer interface is connected to the first slot and not faulted.

6. The bus controller according to claim 2 wherein:
the state machine further comprises a fault state that is entered for a condition selected from among a group of conditions comprising a bus interface self-test failure, a failure to download an appropriate executable program, and detection of monitored signals that supply conflicting interface configuration information.

7. The bus controller according to claim 2 wherein:
the state machine further comprises a power up state that is entered for a condition of initial power application to the bus interface.

8. The bus controller according to claim 2 wherein:
the dual ported bus interface further comprises a configuration switch, the peer interface having a corresponding configuration switch; and
the secondary state is entered for a condition of no faults, the bus interface is correctly connected, the bus interface configuration switch matches the peer interface configuration switch, and the peer interface has assumed the primary state.

9. The bus controller according to claim 2 wherein:
the bus interface is capable of defining the state independent of information received from the peer interface.

10. The bus controller according to claim 2 wherein:
the state machine further comprises a power up that is entered for a condition of initial power application to the bus interface, the bus controller being capable of going to any state from the power up state and incapable of going to the power up state from any state.

11. The bus controller according to claim 2 wherein:
the state machine further comprises a fault state, the bus controller being capable of going into the fault state from any state and from the fault state to any state once the fault is cleared for faults that can be cleared.

12. The bus controller according to claim 2 wherein:
in the primary state, the bus controller executes operations selected from among the operations of driving common switches and display devices, generating a signal to indicate the bus interface is in the primary state, connecting the bus interface to a bus, enabling the second isolator/expander when in a full bus mode and the first and second front end ports are properly connected, and sending configuration information to the peer interface.

13. The bus controller according to claim 2 wherein:
in the primary state, the bus controller executes operations selected from among the group of operations comprising driving common switches and display devices, generating a signal to indicate the bus interface is in the primary state, connecting the bus interface to a bus, enabling the second isolator/expander when in a full bus mode and the first and second front end ports are properly connected, and sending configuration information to the peer interface.

14. The bus controller according to claim 2 wherein:
in the secondary state, the bus controller executes operations selected from among the group of operations comprising comparing configuration with peer configuration to determine whether configuration is proper, connecting the bus interface to a bus, enabling one isolator/expander depending on bus interface slot location.

15. The bus controller according to claim 2 wherein the one or more pseudo-primary states further comprise:

a first pseudo-primary state that is entered for a condition that the first and second front end ports are not connected or the first and second front end ports are connected properly with no term power, and the peer interface cannot assume primary state; and
a pseudo-fault primary state that is entered for a condition that only one front end port is not connected or a low voltage differential (LVD) connection is not made, and the peer interface cannot assume the primary state, and
in the first pseudo-primary state, the bus controller executes operations selected from among the group of operations comprising driving common switches and display devices, isolating the front end ports from a backplane coupled to the first and second slots, preventing driving an external primary signal while driving an internal primary signal, and sending configuration information to the peer interface.

16. The bus controller according to claim 2 wherein:
the one or more pseudo-primary states further comprise:
a first pseudo-primary state that is entered for a condition that the first and second front end ports are not connected or the first and second front end ports are connected properly with no term power, and the peer interface cannot assume primary state; and
a pseudo-fault primary state that is entered for a condition that only one front end port is not connected or a low voltage differential (LVD) connection is not made, and the peer interface cannot assume the primary state, and
in the first pseudo-primary state, the bus controller executes operations selected from among the group of operations comprising driving common switches and display devices, isolating the front end ports from a backplane coupled to the first and second slots, preventing driving an external primary signal while driving an internal primary signal, and sending configuration information to the peer interface.

17. The bus controller according to claim 2 wherein:
the one or more pseudo-primary states further comprise:
a first pseudo-primary state that is entered for a condition that the first and second front end ports are not connected or the first and second front end ports are connected properly with no term power, and the peer interface cannot assume primary state; and
a pseudo-fault primary state that is entered for a condition that only one front end port is not connected or a low voltage differential (LVD) connection is not made, and the peer interface cannot assume the primary state, and
in the pseudo-fault primary state, the bus controller executes operations selected from among the group of operations comprising driving common switches and display devices to indicate an improper front end configuration, resetting the first and second isolator/expanders to isolate the front end ports from a backplane coupled to the first and second slots, preventing driving an external primary signal while driving an internal primary signal, and maintaining a front end bus reset while releasing the backplane after isolator/expander disable.

18. The bus controller according to claim 2 wherein:
the one or more pseudo-secondary states further comprise:
a first pseudo-secondary state that is entered for a condition that the first and second front end ports are not connected or the first and second front end ports are connected properly with no term power, and the peer interface is connected to the first slot and not faulted; and a pseudo-fault secondary state that is entered for a condition that only one front end port is not connected or a low voltage differential (LVD) connection is not made or the bus interface and peer interface configurations mismatch, and the peer interface is connected to the first slot and not faulted, and in the first pseudo-secondary state, the bus controller executes operations selected from among the group of operations comprising isolating the front end ports from a backplane coupled to the first and second slots, preventing driving an external primary signal while driving an internal primary signal, and comparing bus interface configuration to peer interface configuration to determine is configuration is proper and transitioning state if improper.

19. The bus controller according to claim 2 wherein:

the one or more pseudo-secondary states further comprise:

a first pseudo-secondary state that is entered for a condition that the first and second front end ports are not connected or the first and second front end ports are connected properly with no term power, and the peer interface is connected to the first slot and not faulted; and a pseudo-fault secondary state that is entered for a condition that only one front end port is not connected or a low voltage differential (LVD) connection is not made or the bus interface and peer interface configurations mismatch, and the peer interface is connected to the first slot and not faulted, and in the pseudo-fault secondary state, the bus controller executes operations selected from among the group of operations comprising driving common switches and display devices to indicate an improper configuration, resetting the first and second isolator/expanders to isolate the front end ports from a backplane coupled to the first and second slots, preventing driving an external primary signal while driving an internal primary signal, and discontinuing driving a primary signal if possible.

20. The bus controller according to claim 2 wherein:

the state machine further comprises a fault state that is entered for a condition selected from among a group of conditions comprising a bus interface self-test failure, a failure to download an appropriate executable program, and detection of monitored signals that supply conflicting interface configuration information; and in the fault state, the bus controller executes operations selected front among the group of operations comprising resetting the isolator/expanders to isolate the first and second front end ports from a backplane coupled to the first and second slots, driving a fault display device, driving a fault signal to notify the poor interface of the fault condition, and maintaining connection of the controller with the bus to maintain interaction with a host.

21. A bus interface comprising:

first and second front end ports configured for connection to hosts;

first and second isolator/expanders respectively coupled to the first and second front end ports;

a backplane interface configured for insertion into one of first and second slots for connection to one or more buses;

a controller coupled to the first and second isolator/expanders and coupled to a peer interface; and a state machine coupled to the controller and adapted to operate in a plurality of states, the state machine using front end connection status in combination with signals from the peer interface to determine state, the plurality of states comprising:

a primary state entered for a condition of no faults, a correctly-connected bus interface, and the peer interface not presently in the primary state; and a secondary state entered for a condition of no faults, the correctly-connected bus interface, and the peer interface presently in the primary state.

22. A dual ported bus interface capable of operating in concert with a peer interface, the bus interface being capable of insertion into one of first and second slots for connection to one or more buses, the bus controller comprising:

first and second front end ports capable of connecting to hosts;

first and second isolator/expanders respectively coupled to the first and second front end ports;

a controller coupled to the first and second isolator/expanders; and a state machine coupled to the controller and capable of operating in a plurality of states, the state machine using front end connection status in combination with signals from the peer interface to determine state, wherein the state machine is capable of operating in a plurality of states comprising:

a primary state that is entered for a condition of no faults, the bus interface is correctly connected, and the peer interface is not presently in the primary state;

one or more pseudo-primary states that are entered for a condition of one or more front end ports not connected or term power is lacking for one or more of the front end ports, and the peer interface cannot assume the primary state;

a secondary state that is entered for a condition of no faults, the bus interface is correctly connected, and the peer interface has assumed the primary state; and one or more pseudo-secondary states that are entered for a condition of one or more front end ports not connected, term power is lacking for one or more of the front end ports, and the peer interface is connected to the first slot and not faulted.

23. The bus interface according to claim 22 wherein the one or mare pseudo-primary states further comprise:

a first pseudo-primary state that is entered for a condition that the first and second front end ports are not connected or the first and second front end ports are connected properly with no term power, and the peer interface cannot assume primary state; and a pseudo-fault primary state that is entered for a condition that only one front end port is not connected or a low voltage differential (LVD) connection is not made, and the peer interface cannot assume the primary state.

24. The bus interface according to claim 22 wherein:

the dual ported bus interface further comprises a configuration switch, the peer interface having a corresponding configuration switch; and the one or more pseudo-secondary states further comprise:

a first pseudo-secondary state that is entered for a condition that the first and second front end ports are not connected or the first and second front end ports are connected properly with no term power, and the peer interface is connected to the first slot and not faulted; and a pseudo-fault secondary state that is entered for a condition that only one front end port is not connected or a low voltage differential (LVD) connection is not made or the bus interface and peer interface configuration switches mismatch, and the peer interface is connected to the first slot and not faulted.

25. The bus interface according to claim 22 wherein:
the state machine further comprises a fault state that is entered for a condition selected from among a group of conditions comprising a bus interface self-test failure, a failure to download an appropriate executable program, and detection of monitored signals that supply conflicting interface configuration information.

26. The bus interface according to claim 22 wherein:
the state machine further comprises a power up state that is entered for a condition of initial power application to the bus interface.

27. A method of controlling a bus interface comprising:
controlling a dual ported bus interface having first and second front end ports in conjunction with a peer interface, the bus interface being capable of insertion into one of first and second slots;
determining bus interface state based on information from the peer interface received across the backplane and status of the first and second front end ports;
operating in a primary state in a condition of no faults, the bus interface correctly connected, and the peer interface not presently in the primary state; and
operating in a secondary state in a condition of no faults, the bus interface correctly connected, and the peer interface operating in the primary state.

28. A method of controlling a bus interface comprising:
controlling a dual ported bus interface having first and second front end ports in conjunction with a peer interface, the bus interface being capable of insertion into one of first and second slots;
determining bus interface state based on information from the peer interface received across the backplane and status of the first and second front end ports;
managing first and second isolator/expanders respectively coupled to the first and second front end ports;
operating in a primary state in a condition of no faults, the bus interface is correctly connected, and the peer interface is not presently in the primary state;
operating in one or more pseudo-primary states in a condition of one or more front end ports not connected or term power is lacking for one or more of the front end ports, and the peer interface cannot assume the primary state;
operating in a secondary state in a condition of no faults, the bus interface is correctly connected, and the peer interface has assumed the primary state; and
operating in one or more pseudo-secondary states in a condition of one or more front end ports not connected, term power is lacking for one or more of the front end ports, and the peer interface is connected to the first slot and not faulted.

29. The method according to claim 28 further comprising in the primary state:
driving common switches and display devices;
generating a signal to indicate the bus interface is in the primary state;
connecting the bus interface to a bus, enabling the second isolator/expander when in a full bus mode and the first and second front end ports are properly connected; and
sending configuration information to the peer interface.

30. The method according to claim 28 further comprising in the secondary state:
comparing configuration with peer configuration to determine whether configuration is proper;
connecting the bus interface to a bus; and
enabling one isolator/expander depending on bus interface slot location.

31. The method according to claim 28 further comprising:
operating in a first pseudo-primary state in a condition that the first and second front end ports are not connected or the first and second front end ports are connected properly with no term power, and the peer interface cannot assume primary state; and
operating in a pseudo-fault primary state in a condition that only one front end port is not connected or a low voltage differential (LVD) connection is not made, and the peer interface cannot assume the primary state.

32. The method according to claim 31 further comprising in the first pseudo-primary state:
driving common switches and display devices;
isolating the front end ports from a backplane coupled to the first and second slots;
preventing driving an external primary signal while driving an internal primary signal; and
sending configuration information to the peer interface.

33. The method according to claim 31 further comprising in the pseudo-fault primary state:
driving common switches and display devices to indicate an improper front end configuration;
resetting the first and second isolator/expanders to isolate the front end ports from a backplane coupled to the first and second slots;
preventing driving an external primary signal while driving an internal primary signal; and
maintaining a front end bus reset while releasing the backplane after isolator/expander disable.

34. The method according to claim 28 further comprising:
operating a first pseudo-secondary state in a condition that the first and second front end ports are not connected or the first and second front end ports are connected properly with no term power, and the peer interface is connected to the first slot and not faulted; and
operating in a pseudo-fault secondary state in a condition that only one front end port is not connected or a low voltage differential (LVD) connection is not made or the bus interface and peer interface configuration switches mismatch, and the peer interface is connected to the first slot and not faulted.

35. The method according to claim 34 further comprising in the first pseudo-secondary state:
isolating the front end ports from a backplane coupled to the first and second slots;
preventing driving an external primary signal while driving an internal primary signal; and
comparing bus interface configuration to peer interface configuration to determine is configuration is proper and transitioning state if improper.

36. The method according to claim 34 further comprising in the pseudo-fault secondary state:
- driving common switches and display devices to indicate an improper configuration;
- resetting the first and second isolator/expanders to isolate the front end ports from a backplane coupled to the first and second slots;
- preventing driving an external primary signal while driving an internal primary signal; and
- discontinuing driving a primary signal if possible.

37. The method according to claim 28 further comprising:
- operating in a fault state in a condition selected from among a group of conditions comprising a bus interface self-test failure, a failure to download an appropriate executable program, and detection of monitored signals that supply conflicting interface configuration information.

38. The method according to claim 37 further comprising in the fault state:
- resetting the isolator/expanders to isolate the first and second front end ports from a backplane coupled to the first and second slots;
- driving a fault display device, driving a fault signal to notify the peer interface of the fault condition; and
- maintaining connection of the controller with the bus to maintain interaction with a host.

39. The method according to claim 28 further comprising:
- operating in a power up state in a condition of initial power application to the bus interface.

40. The bus controller according to claim 1 wherein bus interface states further comprise:
- one or more pseudo-primary states entered for a condition of one or more front end ports not connected or term power lacking for one or more of the front end ports, and the peer interface cannot assume the primary state; and
- one or more pseudo-secondary states entered for a condition of one or more front end ports not connected, term power lacking for one or more of the front end ports, and the peer interface connected to the first slot and not faulted.

41. The bus interface according to claim 21 wherein the plurality of states further comprises:
- one or more pseudo-primary states entered for a condition of one or more front end ports not connected or term power lacking for one or more of the front end ports, and the peer interface cannot assume the primary state; and
- one or more pseudo-secondary states entered for a condition of one or more front end ports not connected, term power lacking for one or more of the front end ports, and the peer interface connected to the first slot and not faulted.

* * * * *

UNITED STATES PATENT AND TRADEMARK OFFICE
CERTIFICATE OF CORRECTION

PATENT NO.         : 7,076,588 B2
APPLICATION NO. : 10/370414
DATED                 : July 11, 2006
INVENTOR(S)      : Anthony Joseph Benson et al.

It is certified that error appears in the above-identified patent and that said Letters Patent is hereby corrected as shown below:

In column 4, line 54, delete "12C" and insert -- I2C --, therefor.

In column 15, line 11, delete "(FE_LVD IND)" and insert -- (FE_LVD_IND) --, therefor.

In column 17, line 52, delete "but" and insert -- bus --, therefor.

In column 20, line 8, delete "BCC_FLT OUT" and insert -- BCC_FLT_OUT --, therefor.

In column 35, line 25, after "desired." insert a paragraph, therefor.

In column 35, line 54, in Claim 1, after "backplane" delete ";".

In column 39, line 18, in Claim 18, after "determine" delete "is" and insert -- if --, therefor.

In column 39, line 55, in Claim 20, delete "front" and insert -- from --, therefor.

In column 39, line 59, in Claim 20, delete "poor" and insert -- peer --, therefor.

In column 40, line 52, in Claim 23, delete "mare" and insert -- more --, therefor.

In column 42, line 66, in Claim 35, after "determine" delete "is" and insert -- if --, therefor.

Signed and Sealed this

Fifth Day of May, 2009

JOHN DOLL
*Acting Director of the United States Patent and Trademark Office*